United States Patent
Bergant et al.

(10) Patent No.: US 7,769,722 B1
(45) Date of Patent: Aug. 3, 2010

(54) REPLICATION AND RESTORATION OF MULTIPLE DATA STORAGE OBJECT TYPES IN A DATA NETWORK

(75) Inventors: Milena Bergant, North Grafton, MA (US); John M. Hayden, Holliston, MA (US); Himabindu Tummala, South Grafton, MA (US); Santosh Pasula Reddy, Marlborough, MA (US); Daniel Zhu, Nashua, NH (US)

(73) Assignee: EMC Corporation, Hopkinton, MA (US)

( * ) Notice: Subject to any disclaimer, the term of this patent is extended or adjusted under 35 U.S.C. 154(b) by 832 days.

(21) Appl. No.: 11/608,780

(22) Filed: Dec. 8, 2006

(51) Int. Cl.
*G06F 17/00* (2006.01)
(52) U.S. Cl. ...................... 707/681; 707/685
(58) Field of Classification Search ............ None
See application file for complete search history.

(56) References Cited

U.S. PATENT DOCUMENTS

| | | |
|---|---|---|
| 5,434,994 A | 7/1995 | Shaheen et al. |
| 5,504,899 A | 4/1996 | Raz |
| 5,504,900 A | 4/1996 | Raz |
| 5,596,706 A | 1/1997 | Shimazaki et al. |
| 5,701,480 A | 12/1997 | Raz |
| 5,893,140 A | 4/1999 | Vahalia et al. |
| 5,901,327 A | 5/1999 | Ofek |
| 5,974,563 A | 10/1999 | Beeler, Jr. |
| 6,016,501 A | 1/2000 | Martin et al. |
| 6,101,497 A | 8/2000 | Ofek |
| 6,324,581 B1 | 11/2001 | Xu et al. |
| 6,654,912 B1 | 11/2003 | Viswanathan et al. |
| 6,665,815 B1 | 12/2003 | Goldstein et al. |
| 6,675,153 B1 | 1/2004 | Cook et al. |

(Continued)

FOREIGN PATENT DOCUMENTS

EP     0672985 A1     9/1995

(Continued)

OTHER PUBLICATIONS

"Data Versioning Systems," by Zhu, Ningning. (2003) Available at: http://citeseerx.ist.psu.edu/viewdoc/summary?doi=10.1.1.13.3651 Last Visited: Sep. 20, 2009.*

(Continued)

*Primary Examiner*—Neveen Abel Jalil
*Assistant Examiner*—Daniel Kinsaul
(74) *Attorney, Agent, or Firm*—Richard Auchterlonie; Novak Druce & Quigg, LLP

(57) ABSTRACT

A data storage server is programmed for management, version control, and scheduling of replication of multiple types of data storage objects including iSCSI LUNs and file systems. The version control determines if two data storage objects are the same or have a common base so that only a difference needs to be transmitted for replication or restoration. A replication job may specify a "one-to-many" replication or a cascaded replication, and any snapshot retention policy is propagated during a cascaded replication. Concurrent replication sessions to the same destination are paced in accordance with respective allocation shares of the reception bandwidth. File handle information is replicated so that a file handle issued by a primary data storage server can be used for accessing a replicated file in a secondary data storage server.

2 Claims, 22 Drawing Sheets

U.S. PATENT DOCUMENTS

| | | | |
|---|---|---|---|
| 6,691,245 | B1 | 2/2004 | DeKoning |
| 6,694,447 | B1 | 2/2004 | Leach et al. |
| 6,732,124 | B1 | 5/2004 | Koseki et al. |
| 6,938,039 | B1 | 8/2005 | Bober et al. |
| 6,941,490 | B2 | 9/2005 | Ohran |
| 6,948,089 | B2 | 9/2005 | Fujibayashi |
| 6,959,310 | B2 * | 10/2005 | Eshel et al. .................. 707/200 |
| 6,978,280 | B1 * | 12/2005 | Cochran et al. ..................... 1/1 |
| 7,010,553 | B2 | 3/2006 | Chen et al. |
| 7,076,509 | B1 | 7/2006 | Chen et al. |
| 7,185,062 | B2 | 2/2007 | Lolayekar et al. |
| 7,275,177 | B2 | 9/2007 | Armangau et al. |
| 7,284,019 | B2 * | 10/2007 | Adkins et al. ........................ 1/1 |
| 7,373,364 | B1 * | 5/2008 | Chapman .................... 707/204 |
| 7,475,098 | B2 | 1/2009 | Patterson et al. |
| 7,509,465 | B1 | 3/2009 | Misra et al. |
| 2001/0044910 | A1 | 11/2001 | Ricart et al. |
| 2002/0112134 | A1 | 8/2002 | Ohran et al. |
| 2002/0133507 | A1 | 9/2002 | Holenstein et al. |
| 2003/0093413 | A1 | 5/2003 | Dettinger et al. |
| 2003/0177194 | A1 | 9/2003 | Crocker et al. |
| 2003/0200480 | A1 * | 10/2003 | Beattie ........................ 714/13 |
| 2003/0217119 | A1 | 11/2003 | Raman et al. |
| 2004/0030668 | A1 | 2/2004 | Pawlowski et al. |
| 2004/0030822 | A1 | 2/2004 | Rajan et al. |
| 2004/0059822 | A1 | 3/2004 | Jiang et al. |
| 2004/0139128 | A1 | 7/2004 | Becker et al. |
| 2004/0163009 | A1 | 8/2004 | Goldstein et al. |
| 2004/0210583 | A1 | 10/2004 | Enko et al. |
| 2004/0260873 | A1 | 12/2004 | Watanabe |
| 2004/0267758 | A1 | 12/2004 | Katsurashima |
| 2004/0267836 | A1 | 12/2004 | Armangau et al. |
| 2005/0015663 | A1 | 1/2005 | Armangau et al. |
| 2005/0044162 | A1 | 2/2005 | Liang et al. |
| 2005/0065986 | A1 | 3/2005 | Bixby et al. |
| 2005/0114408 | A1 * | 5/2005 | Gold et al. .................. 707/203 |
| 2005/0193245 | A1 | 9/2005 | Hayden et al. |
| 2005/0228950 | A1 | 10/2005 | Karr |
| 2005/0234931 | A1 | 10/2005 | Yip et al. |
| 2006/0031188 | A1 | 2/2006 | Lara et al. |
| 2006/0143412 | A1 | 6/2006 | Armangau et al. |
| 2006/0149997 | A1 * | 7/2006 | Chai et al. ...................... 714/6 |
| 2006/0179261 | A1 | 8/2006 | Rajan |
| 2006/0190692 | A1 * | 8/2006 | Yamagami .................. 711/162 |
| 2007/0061379 | A1 | 3/2007 | Wong et al. |
| 2007/0067263 | A1 * | 3/2007 | Husain et al. .................. 707/2 |
| 2007/0078982 | A1 | 4/2007 | Aidun et al. |
| 2007/0094467 | A1 * | 4/2007 | Yamasaki .................. 711/162 |
| 2007/0136389 | A1 | 6/2007 | Bergant et al. |
| 2007/0136548 | A1 | 6/2007 | Mane |
| 2007/0168516 | A1 | 7/2007 | Liu et al. |
| 2007/0198659 | A1 | 8/2007 | Lam |
| 2007/0208783 | A1 | 9/2007 | Midgley |
| 2007/0255818 | A1 | 11/2007 | Tanzer et al. |
| 2007/0276885 | A1 | 11/2007 | Valiyaparambil et al. |
| 2008/0005468 | A1 | 1/2008 | Faibish et al. |
| 2008/0104139 | A1 * | 5/2008 | Xu et al. ..................... 707/202 |
| 2008/0250086 | A1 | 10/2008 | Kisley |
| 2008/0250215 | A1 | 10/2008 | Shitomi |

FOREIGN PATENT DOCUMENTS

| | | | |
|---|---|---|---|
| EP | | 0674263 A1 | 9/1995 |

OTHER PUBLICATIONS

Bill Nowicki, Network Working Group, RFC 1094, "NFS: Network File System Protocol Specification," Mar. 1989, 27 pages, Sun Microsystems, Inc., Santa Clara, CA.

Paul L. Leach and Dilip C. Naik, "A Common Internet File System," Microsoft Corporation, Redmond, WA, Dec. 19, 1997, 121 pages.

J. Satran et al., RFC 3720, "Internet Small Computer System Interface (iSCSI)," Apr. 2004, 257 pages, Network Working Group, The Internet Society, Reston, VA.

EMC Celerra SE5 File Server, Feb. 2002, 2 pages, EMC Corporation, Hopkinton, Mass. 01748-9103.

"Celerra File Server in the E-Infostructure," 2000, 9 pages, EMC Corporation, Hopkinton, Mass.

"Celerra File Server Architecture for High Availability," Aug. 1999, 11 pages, EMC Corporation, Hopkinton, Mass.

Prabhu Ram & Lyman Do, "Extracting Delta for Incremental Data Warehouse Maintenance," 16th International Conference on Data Engineering, San Diego, CA, Feb. 28-Mar. 3, 2000, Proceedings, pp. 220-229, IEEE Computer Society, IEEE, New York, NY.

Chutani, Sailesh, et al., "The Episode File System," Jun. 1991, 18 pages, Carnegie Mellon University IT Center, Pittsburgh, PA.

D.L. Burkes and R.K. Treiber, "Design Approaches for Real-Time Transaction Processing Remote Site Recovery," Digest of Papers in Spring COMPCON90, Feb. 26-Mar. 2, 1990, Thirty-Fifth IEEE Computer Society International Conference, San Francisco, CA, pp. 568-572, IEEE, New York, NY.

"Network Data Management Protocol (NDMP)," ndmp.org; NDMP White Paper, "Protocol Specification Summary, Document Version: 1.7.2S," ndmp.org; "Legato Systems Embraces the NDMP Standard: Legato Networker Software to be NDMP Compliant in Q3," legato.com; published at least as early as Oct. 11, 1999, 17 pages.

R. Stager and D. Hitz, Internet Draft filename "draft-stager-iquard-netapp-backup-05.txt," Network Data Management Protocol (NDMP), last update Oct. 12, 1999, pp. 1-73.

Koop, P., "Replication at Work. (four companies use Oracle and Sybase replication servers to solve business problems)," DBMS, Mar. 1995, vol. 8, No. 3, p. 54(4).

"Remote Mirroring Technical White Paper," Copyright 1994-2002, 25 pages, Sun Microsystems, Santa Clara, CA, published at least as early as May 17, 2002 at sun.com.

"EMC TechNote: Celerra Replicator," 2002, 5 pages, EMC Corporation, Hopkinton, MA.

"EMC TimeFinder Product Description Guide", Dec. 1998, 34 pages, EMC Corporation, Hopkinton, MA.

"Leveraging SnapView/IP in Oracle8i Environments with the CLARiiON IP4700 File Server," Engineering White Paper, Feb. 13, 2002, 17 pages, EMC Corporation, Hopkinton, MA.

"Using EMC CLARiiON FC4700 and SnapView with Oracle 8i," Engineering White Paper, Mar. 4, 2002, pp. 1-22, EMC Corporation, Hopkinton, MA.

"Disaster Recovery Guidelines for using HP SureStore E XP256, Continuous Access XP with Oracle Databases," Rev 1.03, May 24, 2000, pp. 1-28, Hewlett-Packard Company, Palo Alto, CA.

"Enterprise Volume Manager and Oracle8 Best Practices," Compaq White Paper, Dec. 1999, pp. 1-11, Compaq Computer Corporation, Houston, Tx.

Veritas Database Edition for Oracle, "Guidelines for Using Storage Checkpoint and Storage Rollback with Oracle Databases," Aug. 2001, 19 pages, Veritas Software Corporation, Mountain View, CA.

"Veritas Volume Replication and Oracle Databases," A Solutions White Paper, May 29, 2000, pp. 1-31, Veritas Software Corporation, Mountain View, CA.

Nabil Osorio and Bill Lee, "Guidelines for Using Snapshot Storage Systems for Oracle Databases," Oct. 2001, 13 pages, Oracle Corporation, Redwood Shores, CA.

"EMC PowerPath—Storage Virtualization," Sep. 2003, 2 pages, EMC Corporation, Hopkinton, MA.

"EMC Symmetrix Data Migration Services," Jul. 2001, 4 pages, EMC Corporation, Hopkinton, MA.

"Global Recovery Demonstration: SRDF/A and PRIMECLUSTER," Feb. 2004, 27 pages, EMC Corporation, Hopkinton, MA.

"Using Asynchronous Replication for Business Continuity between Two or More Sites," Dec. 2004, 20 pages, EMC Corporation, Hopkinton, MA.

"EMC Open Replicator for Symmetrix," Jan. 2005, 12 pages, EMC Corporation, Hopkinton, MA.

John Phillips, "Storage Consolidation and Data Protection using MultiStoreTM," Feb. 18, 2003, 13 pages, Network Appliance, Inc., Sunnyvale, CA.

* cited by examiner

```
                    NON-DISRUPTIVE MIGRATION WITH
                    PERSISTENT FILE HANDLES
                              │
                              ▼                                     ┌─331
┌────────────────────────────────────────────────────────────────────┐
│  INTERCONNECT THE DESTINATION FILE SERVER TO THE IP NETWORK        │
│  BETWEEN THE SOURCE FILE SERVER AND THE ORIGINAL CLIENTS OF        │
│  THE SOURCE FILE SERVER SO THAT THE DESTINATION FILE SERVER        │
│  MAY ASSUME THE IP ADDRESS OF THE SOURCE FILE SERVER AND           │
│  INTERCEPT FILE ACCESS REQUESTS FROM THE ORIGINAL CLIENTS          │
└────────────────────────────────────────────────────────────────────┘
                              │
                              ▼                                     ┌─332
┌────────────────────────────────────────────────────────────────────┐
│  CREATE A REPLICATION SESSION FOR EACH SOURCE FILE SYSTEM          │
│  AND SPECIFY THE VOLUME POOL AS THE DESTINATION FILE SYSTEM.       │
│  THE SOURCE FILE SERVER SENDS THE SOURCE FILE SYSTEM               │
│  METADATA INCLUDING THE VOLUME NAME AND FSID OF EACH               │
│  SOURCE FILE SYSTEM TO THE DESTINATION FILE SERVER, AND THE        │
│  DESTINATION FILE SERVER ALLOCATES A STORAGE VOLUME FROM           │
│  ITS FREE VOLUME POOL TO CONTAIN THE SECONDARY COPY OF             │
│  THE SOURCE FILE SYSTEM                                            │
└────────────────────────────────────────────────────────────────────┘
                              │
                              ▼                                     ┌─333
┌────────────────────────────────────────────────────────────────────┐
│  THE DESTINATION FILE SERVER CHECKS WHETHER OR NOT THE             │
│  "FSID" OF EACH SOURCE FILE SYSTEM IS ALREADY IN USE ON THE        │
│  DESTINATION FILE SERVER. IF THE "FSID" OF THE SOURCE FILE         │
│  SYSTEM IS NOT ALREADY IN USE ON THE DESTINATION FILE SERVER,      │
│  THEN THE DESTINATION FILE SERVER ASSIGNS THE SAME "FSID" TO       │
│  THE STORAGE VOLUME TO CONTAIN THE SECONDARY COPY OF THE           │
│  SOURCE FILE SYSTEM. IF THE FSID IS ALREADY IN USE, THEN THE       │
│  DESTINATION FILE SERVER AUTOMATICALLY RESOLVES THE                │
│  CONFLICT BY UNMOUNTING, ASSIGNING A NEW FSID, AND                 │
│  REMOUNTING THE CONFLICTING VOLUME ALREADY IN USE ON THE           │
│  DESTINATION FILE SERVER, AND ONCE ANY STALE FILE HANDLES          │
│  ARE NO LONGER USABLE BY CLIENTS OF THE DESTINATION FILE           │
│  SERVER, THE OLD FSID IS ASSIGNED TO THE STORAGE VOLUME            │
│  ALLOCATED TO CONTAIN THE SECONDARY COPY OF THE SOURCE             │
│  FILE SYSTEM.                                                      │
└────────────────────────────────────────────────────────────────────┘
                              │
                              ▼                                     ┌─334
┌────────────────────────────────────────────────────────────────────┐
│  THE DESTINATION FILE SERVER ASSUMES THE IP ADDRESS OF THE         │
│  SOURCE FILE SERVER, AND REPLICATION MAY CONTINUE IN               │
│  BACKGROUND, CONCURRENT WITH THE DESTINATION FILE SERVER           │
│  GIVING PRIORITY TO SERVICING FILE ACCESS REQUESTS FROM            │
│  ORIGINAL CLIENTS OF THE SOURCE FILE SERVER                        │
└────────────────────────────────────────────────────────────────────┘
                              │
                              ▼
                            ( END )                        FIG. 25
```

REPLICATION AND RESTORATION OF MULTIPLE DATA STORAGE OBJECT TYPES IN A DATA NETWORK

FIELD OF THE INVENTION

The present invention relates generally to data processing, and more particularly to replication of data storage objects from computer data storage of servers in a data network.

BACKGROUND OF THE INVENTION

Remote copy systems have been used for automatically providing data backup at a remote site in order to insure continued data availability after a disaster at a primary site. Such a remote copy facility is described in Ofek, U.S. Pat. No. 5,901,327 issued May 4, 1999, entitled "Bundling of Write Data from Channel Commands in a Command Chain for Transmission over a Data Link Between Data Storage Systems For Remote Data Mirroring." This remote copy facility uses a dedicated network link and a link-layer protocol for 1:1 replication between a primary storage system and a secondary storage system.

More recently remote copy systems have been used for wide-area distribution of read-only data. Wide-area distribution of the read-only data is useful for preventing remote users from overloading a local server, and for reducing signal transmission delay because the remote users may access remote copies nearer to them. For example, as described in Raman et al., U.S. Patent Application Publication No. US 2003/0217119 A1, published Nov. 20, 2003, incorporated herein by reference, consistent updates are made automatically over a wide-area IP network, concurrently with read-only access to the remote copies. A replication control protocol (RCP) is layered over TCP/IP providing the capability for a remote site to replicate and rebroadcast blocks of the remote copy data to specified groups of destinations, as configured in a routing table.

Currently there is a need for replicating diverse data storage objects in a way that is scalable and efficient and may use a replication control protocol for one-to-many replication and cascaded replication over a data network.

SUMMARY OF THE INVENTION

In accordance with one aspect, the invention provides a method of restoring, in a first data storage server, a data storage object from a desired version (which may or may not be the most recent version) of the data storage object. The desired version of the data storage object resides in data storage of a second data storage server. The method includes the first data storage server communicating with the second data storage server to identify a most recent common base snapshot copy of the data storage object. A first copy of the most recent common base snapshot copy resides in data storage of the first data storage server and a second copy of the most recent common base snapshot copy resides in the data storage of the second data storage server. The second data storage server transmits to the first data storage server changes between the desired version of the data storage object and the second copy of the most recent common base snapshot copy. The first data storage server receives the changes from the second data storage server and uses the changes for restoring, from the first copy of the most recent common base snapshot copy, a local production version of the data storage object. The method is used for restoring, in the first data storage server, an iSCSI LUN data storage object from a desired version of the iSCSI LUN data storage object. The desired version of the iSCSI LUN data storage object resides in the data storage of the second data storage server. The method is also used for restoring, in the first data storage server, a file system data storage object from a desired version of the file system data storage object. The desired version of the file system data storage object resides in the data storage of the second data storage server.

In accordance with another aspect, the invention provides method of replicating data from a first data storage server to a second data storage server and to a third data storage server. The method includes configuring a replication session from the first data storage server to the second data storage server. The replication session has a specified destination data storage server and a specified policy for retention of snapshot copies. The replication session also has a specified policy for propagation. The second data storage server is specified as the destination data storage server of the replication session, and the third data storage server is specified in the specified policy for propagation. The first data storage server executes a job including the configured replication session. Execution of the job causes data being replicated from the first data storage server to the second data storage server, snapshot copies of the replicated data being created and stored in data storage of the second data storage server in accordance with the specified policy for retention of snapshot copies, the second data storage server forwarding the replicated data to the third data storage server in accordance with the specified policy for propagation, and snapshot copies of the replicated data being created and stored in data storage of the third data storage server in accordance with the specified policy for retention of snapshot copies.

In accordance with still another aspect, the invention provides a method including a first data storage server replicating data to a second data storage server in a data network, and during the replication of data from the first data storage server to the second data storage server, adjusting a bandwidth allocation share for the replication of data from the first data storage server to the second data storage server. The first data storage server paces transmission of the replicated data in response to the adjusted bandwidth allocation share for the replication of data from the first data storage server to the second data storage server.

In accordance with a final aspect, the invention provides a method of data replication and access in a data network. The data network includes a first data storage server having first data storage and a second data storage server having second data storage. The method includes the first data storage server replicating a file and file handle information to the second data storage server. The file handle information indicates where the file is stored in the first data storage, and the second data storage server stores the file in the second data storage. The method also includes a network client obtaining, from the first data storage server, a file handle for the file. The file handle indicates where the file is stored in the first data storage, and the network client sends a file access request including the file handle to the second data storage server. The method further includes the second data storage server receiving the file access request from the network client, decoding the file handle from the file access request, and using the file handle and the file handle information for locating the file in the second data storage for accessing the file. In this fashion, by using the file handle obtained by accessing the file system view or namespace in the primary server, the network client may directly read or write to the file in the secondary server without accessing the file system view or namespace in the secondary server.

BRIEF DESCRIPTION OF THE DRAWINGS

Additional features and advantages of the invention will be described below with reference to the drawings, in which:

FIG. 25 shows a flowchart of the non-disruptive file system migration process concurrent with client access using persistent file handles in the data network of FIG. 23 and FIG. 24.

Figure 1:
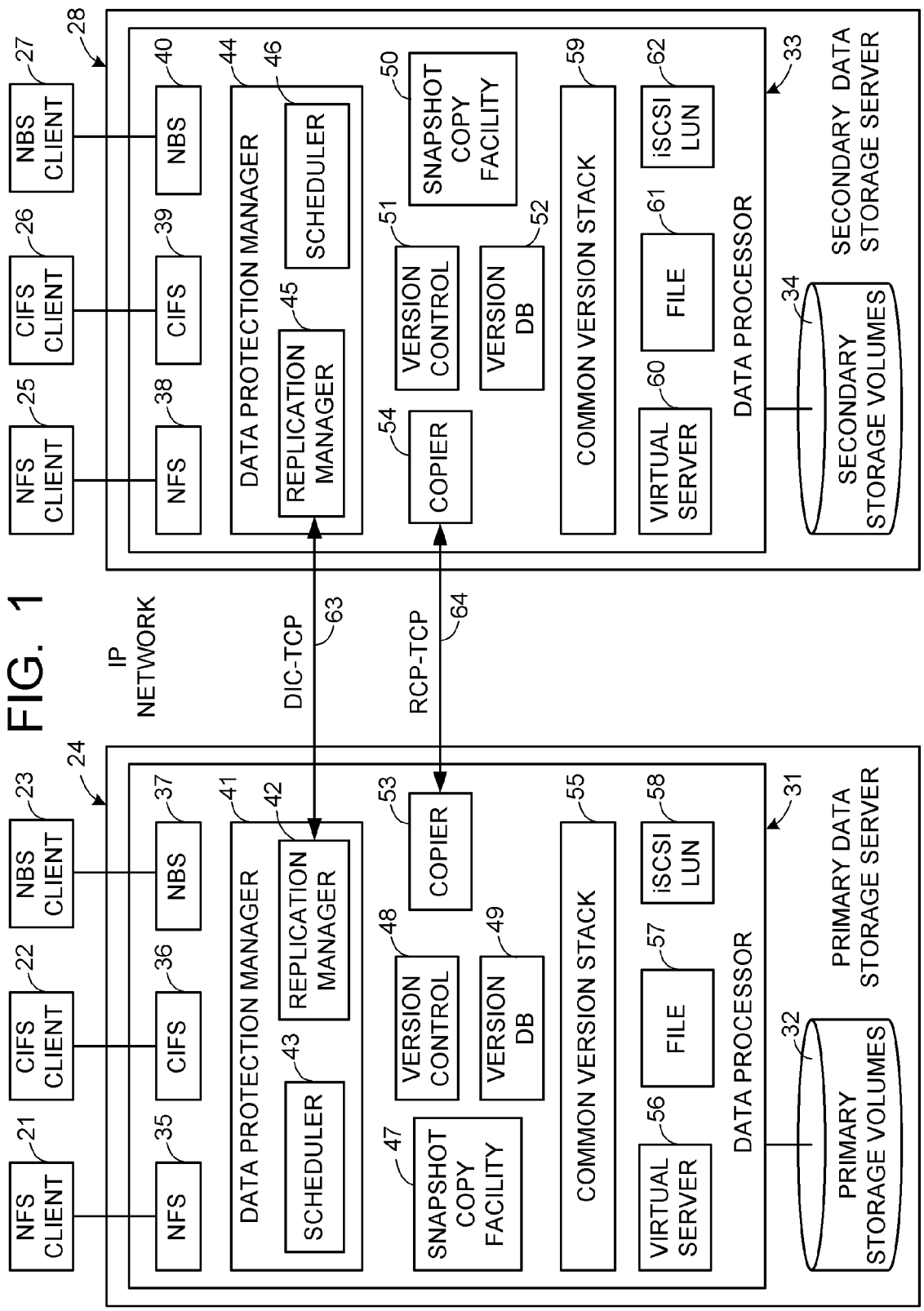
FIG. 1 is a block diagram of a data network in which data storage objects of different data storage object types are asynchronously replicated from a primary data storage server to a secondary data storage server.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown an Internet Protocol (IP) data network including network clients 21, 22, 23 serviced by a primary data storage server 24, and network clients 25, 26, 27 serviced by a secondary data storage server 28. The primary data storage server 24 includes a data processor 31 programmed for providing client access to computer data storage organized as multiple primary storages volumes 32. The data processor 31 is also programmed for asynchronous replication of new client data to the secondary data storage server 28. The secondary data storage server 28 also includes a data processor 33 and secondary storage volumes 34. The data processor 33 is programmed for providing client access to the secondary storage volumes 34 and for receiving replicated data from the primary data storage server 24 and storing the replicated data in the secondary storage volumes. In this fashion, the primary storage volumes 32 store an original copy of client data, and the secondary storage volumes 34 store a backup copy of the client data.

In the data network of FIG. 1, the primary data storage server 24 and the secondary data storage server 28 are programmed for servicing diverse kinds of network clients using different kinds of network protocols for storage access. The network protocols for storage access include the Network File System (NFS) protocol, the Common Internet File System (CIFS) protocol, and a Network Block Services (NBS) protocol. NFS is described, for example, in RFC 1094, Sun Microsystems, Inc., "NFS: Network File Systems Protocol Specification," Mar. 1, 1989. The CIFS protocol is described, for example, in Paul L. Leach and Dilip C. Naik, "A Common Internet File System," Microsoft Corporation, Dec. 19, 1997. A well-known NBS protocol is the Internet Small Computer Systems Interface (iSCSI) protocol described in J. Satran et al., Request for Comments: 3720, Network Working Group, The Internet Society, April 2004.

As shown in FIG. 1, the data processor 31 of the primary data storage server 24 is programmed with an NFS request handler 35 for handling requests from the NFS client 21. The NFS client 21, for example, is a personal computer programmed with a UNIX-based operating system. The data processor 31 is programmed with a CIFS request handler 36 for handling requests from a CIFS client 22. The CIFS client 22, for example, is a personal computer programmed with the Microsoft WINDOWS (Trademark) operating system. The data processor 31 is also programmed with an NBS request handler 37 for handling NBS requests from an NBS client 23. The NBS client 23, for example, is a host computer programmed with a database or scientific data processing application that directly accesses data storage with or without the use of the file system manager commonly provided by the host computer's operating system. In a similar fashion, the data processor 33 of the secondary data storage server 28 is programmed with an NFS request handler 38 for handling requests from the NFS client 25, a CIFS request handler 39 for handling requests from the CIFS client 26, and a NBS request handler 40 for handling requests from the NBS client 27.

The data processor 31 is programmed for replication of data storage objects of multiple data storage object types from the primary storage volumes 32 over the IP network to the secondary data storage server 28. For example, the multiple data storage object types include iSCSI Logical Unit Numbers (LUNs), logical volumes or file systems, directories, files, and virtual servers. A virtual server includes storage volumes allocated to data of clients of the virtual server and also configuration information of the virtual server. The virtual server may also include user mapping and session state information useful for resuming client operations upon failover of the virtual server from the primary data storage server 24 to the secondary data storage server 28. See, for example, John Hayden et al., "Internet Protocol Based Disaster Recovery of a Server," U.S. Published Patent Application No. 2005-0193245 published Sep. 1, 2005, incorporated herein by reference.

The data processor 31 is further programmed with multiple software program modules including common software program modules for management of replication of the data storage objects of the multiple data storage object types. As shown in FIG. 1, these modules implement or support a data protection manager 41 providing snapshot copy and replication services. The modules that implement the data protection manager include a replication manager 42 and a scheduler 43. The replication manager 42 manages the execution of replication jobs that create sessions of replication of specified data storage objects to specified IP destination addresses. The scheduler 43 controls the timing of snapshot creation and deletion, and the timing of replication transmission to remote destinations. The scheduler 43 also may ensure that a replica of a data storage object is out-of-sync with the original of the data storage object by no more than a specified amount of time. In a similar fashion, the data processor 33 of the secondary data storage server 28 is programmed with a data protection manager 44 including a replication manager 45 and a scheduler 46.

The data processor 31 is programmed with a snapshot copy facility 47 for making a snapshot copy of a data storage object concurrent with network client read-write access to a production copy of the data storage object. For example, the snapshot copy facility 47 can be constructed as described in Armangau et al., U.S. Patent Application Publication No. US 2004/0267836 published Dec. 30, 2004, incorporated herein by reference; Armangau et al., U.S. Patent Application Publication No. US 2005/0015663 A1, published Jan. 20, 2005, incorporated herein by reference; or Bixby et al., U.S. Patent Application Pub. No. 2005/0065986 published Mar. 24, 2005, incorporated herein by reference. The snapshot copy facility 47 can make snapshot copies of various kinds of data storage objects such as LUNs, files, directories, file systems, or volumes, concurrent with client read-write access to the data storage objects. For example, the data storage object is encapsulated in a file or logical volume, and the snapshot copy facility 47 makes a snapshot copy of the file or logical volume containing the storage data storage object if the data storage object is not a file or logical volume.

The multiple software program modules further include a version control module 48 executable by the data processor 31 for determining if two data storage objects are the same or have a common base so that only a difference needs to be transmitted for replication or restoration of one of the two data storage objects. A "version" of a data storage object refers generally to a production copy of the data storage object or a snapshot copy of the data storage object. The version control module 48 accesses a version database (DB) 49 containing unique world-wide signatures of the versions of the data storage objects in the primary storage. A unique world-wide signature includes a server ID, a version Set ID, and a Version Number. The Version Set ID identifies the particular storage object, and the Version Number identifies a particular snapshot of the storage object, or the production version of the storage object. For a file system, the Version Set ID includes the file system ID and the file system name. An iSCSI LUN is uniquely identified by a Target ID, a LUN (logical unit number) and a file system ID. A target is a collection of LUNs. The Target ID is also known as an iSCSI Qualified Name (IQN). The version database 49 stores the signatures of the versions separate from the replication sessions. The version database 49 is a data structure maintained by a version set module 121 shown in FIG. 5.

The multiple software program modules include a copier module 53 for asynchronous replication of data storage objects from the primary storage volumes 32 to the secondary data storage server 28. The asynchronous replication can be performed as described in Raman et al., U.S. Patent Application Publication No. US 2003/0217119 A1, published Nov. 20, 2003, incorporated herein by reference. The replication manager 42 issues replication jobs that schedule asynchronous replication sessions conducted by the copier module 53. Each of the asynchronous replication sessions has a unique world-wide session signature. The session signature includes the name of the source version of the data storage object being replicated, the name of the source server, the name of the destination version of the data storage object being replicated, and the name of the destination server. The network client or user requesting the replication session may also define an alias name for the replication session. The session signature is constant until the replication session is deleted. Recreating a deleted replication session will result in a new session signature, but stop/start or reverse of a replication session will preserve the session signature.

The data processor 33 of the secondary data storage server 28 is also programmed with a snapshot copy facility 50, a version control module 51, a version database 52, and a copier module 54. A replication session is initially set up over a data storage server interconnect control (DIC) Transmission Control Protocol (TCP) connection 63 between the replication manager 42 of the primary data storage server 24 and the replication manager 45 of the secondary data storage server 28. The DIC-TCP connection between the replication managers 42, 45 facilitates execution of pre-replication and post-replication events. The actual transmission of the replicated data in accordance with a Replication Control Protocol (RCP) occurs over a separate TCP connection 64 between the copier module 53 in the primary data storage server 24 and a copier module 54 in the secondary data storage server 28.

For example, the primary replication manager 42 can use the DIC-TCP connection sending commands for determining whether or not the secondary data storage server 28 is a valid destination for replication, for configuring the secondary data storage server 28 for replication, for preparing the secondary data storage server for replication, for beginning replication, and for aborting the replication. As further described in Milena Bergant et al., "Replication of a Consistency Group of Data Storage Objects from Servers in a Data Network," U.S.

patent application Ser. No. 11/288,578 filed Nov. 29, 2005, incorporated herein by reference, such pre-replication and post replication events are useful for replicating a consistency group of objects from more than one server. Preparation for replication can be begun at each of the servers, and if any of the servers fail to report that replication can be done without causing a consistency error, then preparation can be aborted so that write access by applications will not be disrupted while the potential problem is diagnosed and eliminated.

Data storage objects of multiple data storage object types are defined by a version stack 55 common to the multiple data storage object types, and software program modules 56, 57, 58 specific to the multiple data storage object types. The virtual server module 56 defines the virtual server data storage object type, the file module 57 defines the file or directory data storage object type, and the iSCSI LUN module 58 defines the iSCSI LUN data storage object type. For example, data storage objects of these different data storage object types are stored in a respective volume version object consisting of logical data blocks of a sparse container file, and the respective software modules 56, 57, 58 defining the different data storage object types are executable by the data processor 31 for addressing of the data storage objects in the respective volume version object. In a similar fashion, the data processor 33 in the secondary data storage server 28 also has a common version stack 59 and software program modules 60, 61, 62 specific to the multiple data storage object types.

A production file itself can be a container for a UNIX-based file system. In this case, the logical extent of the production file serves as a logical volume upon which the file system is built. By using a single production file as a container for a file system, it is possible for the copier 55 to operating upon the production file to replicate the entire file system contained in the production file. Attributes of the container file may indicate when the version of the file system in the container file was created and last accessed. Further details regarding the use of a file as a logical volume for a UNIX-based file system are found in Virendra M. Mane, "File Based Volumes and File Systems," U.S. patent application Ser. No. 11/301,975 filed Dec. 13, 2005, incorporated herein by reference.

Figure 2:
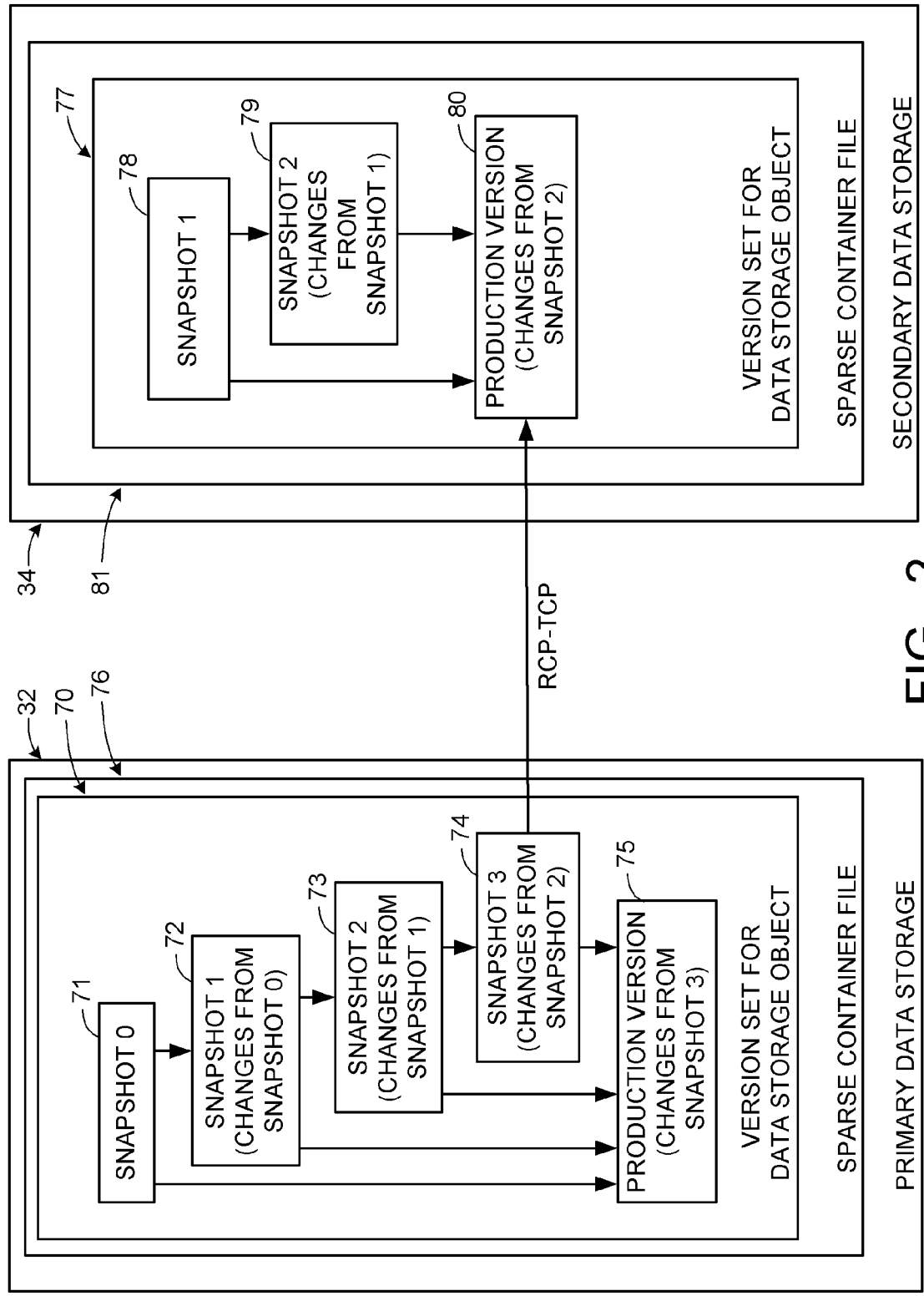
FIG. 2 is a block diagram showing version sets in primary data storage of the primary data storage server and secondary data storage of the secondary data storage server.

FIG. 2 shows a version set 70 in primary data storage 32. The version set 70 includes a series of snapshot copies 71, 72, 73, and 74 of a data storage object, and a production version 75 of the data storage object. The version set 70 is contained in a sparse container file 76. Data blocks that are not changed between two successive versions are stored only once in the sparse container file. Therefore a full set of data blocks is associated with the oldest snapshot 71, and associated with each of the younger versions 72, 73, 74, 75 is the set of blocks that have changed since the prior version.

The replication process asynchronously replicates the versions from the primary data storage 32 to the secondary data storage 34, but the number of versions retained on the secondary storage need not be the same as the number of versions retained on the primary storage. For example, when the oldest snapshot is deleted from primary or secondary storage, only the data blocks that are not shared with a younger version are deleted, and the shared blocks are kept together with the youngest version using these blocks. As shown in FIG. 2, for example, the replicated version set 77 includes a remote copy 78 of the data blocks of the second snapshot, a remote copy 79 of the blocks of the third snapshot that are changes from the second snapshot, and a remote production version 80 including blocks of the third snapshot that have changed since the third snapshot. The replicated version set 77 is stored in a sparse container file 81.

In a preferred implementation, only changes to a data storage object between two snapshots in the primary data storage are replicated to the secondary data storage. For example, in FIG. 2, client applications may have read-write access to the production version 75 in the primary data storage concurrent with replication of the changes between snapshot 3 and snapshot 4 from the primary storage to the secondary data storage. These changes are read from the data structure 74 in the primary data storage, transmitted over the RCP-TCP connection, and written into the production version 80 in the secondary data storage. Concurrent with the writing of the changes in the production version 80 in the secondary storage, a remote client may have read-only access to the snapshots 78 and 79 in the secondary data storage. In a preferred implementation, however, a remote client may not access the production version 80 in the secondary data storage because the production version 80 is in an inconsistent state until all of the changes from the data structure 74 in the primary storage have been written into the production version 80. During the period when the production version 80 is inconsistent because a transfer is in progress, the user access destined for version 80 will be seamlessly redirected to the latest available snapshot, in this case snapshot 79.

In general, different numbers of snapshot copies of a data storage object may be retained in the primary data storage 32 and the secondary data storage 34 depending on a snapshot retention policy for the primary storage and a snapshot retention policy for the secondary data storage. In the absence of an explicit snapshot retention policy, when a replication session has been configured and started for a data storage object, there will be a production version and two snapshots for the data storage object in the primary data storage, and there will be one production version and one snapshot in the secondary data storage, so that changes between the two snapshots in the primary storage can be replicated to the production version in the secondary storage, and once all of the changes between the two snapshots have been replicated to the production version in the secondary storage, the snapshot copy in the secondary storage can be updated or refreshed with all of the changes that have been replicated to the production version in the secondary storage. This ensures that if the versions of the data storage object in the primary storage become inaccessible due to a failure or disaster, then a recent and consistent snapshot copy is available from the secondary storage. In addition, if a remote client is permitted to have concurrent read-only access to the snapshot copy in the secondary data storage, then it is desirable for the updating or refreshing of this snapshot copy to be inhibited when the remote client is granted a read-lock upon this snapshot copy. So that the replication process may continue when a remote client retains a read-lock upon this snapshot copy in the secondary data storage, it is desirable to make a second, more recent snapshot copy from the replicated changes at the time that all of the changes between the two snapshot copies in the primary storage have been replicated to the production copy in the secondary data storage if the read-lock held by the remote client has not been released by that time.

Figure 3:
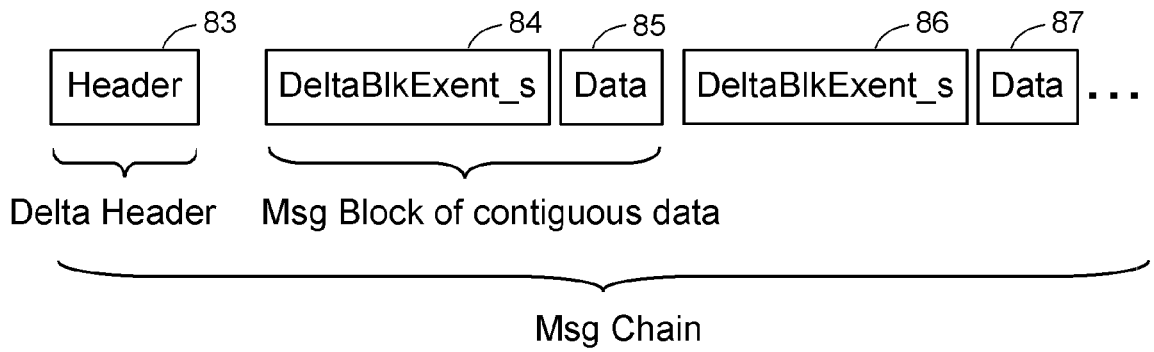
FIG. 3 is a block diagram of a Delta Extent format for transmitting data defining a change or delta between two snapshots.

FIG. 3 shows a Delta Extent format for transmitting data defining a change between two, sometimes successive, versions. The Delta Extent format includes a Delta Header 83, a DeltaBlkExtent_s 84, data 85, DeltaBlkExtent_s 86, and data 87. The Delta Header 83 specifies an object to which the delta relates, the DeltaBlkExtent_s 84, 86 defines an extent by specifying a start address and length in the object of following contiguous data 85, 87. For a delta, the following contiguous data is the new data of the change between the older version and the newer version. The combination of a DeltaBlkExtent_s and following data define a Message Block of contiguous data. The Delta Header and following Message Blocks of contiguous data comprise a Message Chain.

In general, the snapshot facility 47 and the copier 53 in the primary data storage server 24 may replicate a snapshot copy of a data storage object from the primary data storage server 24 to the secondary data storage server 28 concurrent with read-write access by applications to the production version data storage object. Then the copier 53 may replicate a change or "delta" of the production version of the data storage object since snapshot copy from the primary data storage server 24 to the secondary data storage server 28. In a background process, the secondary data storage server 28 may replay the changes to the data storage object since the snapshot copy in order to maintain a remote backup copy of the production version of the data storage object for remote read-only access or for restoration in case of corruption or loss of the primary copy of the production version of the data storage object. The retention time of the snapshots in the secondary data storage 34 may be greater or less than the retention time of the snapshots in the primary data storage 32, as set by snapshot retention policies specified for particular data storage objects in the primary and secondary data storage. The secondary data storage server 28 may also consolidate or merge changes between successive snapshots so that snapshots of less frequent intervals are retained in the secondary data storage 34 than the intervals used for snapshot retention in the primary data storage 32.

The delta extent format provides a means of converting between different formats of a data storage object in the primary and secondary data storage servers. For example, the primary data storage server 24 could use a "copy on first write" snapshot copy facility 47 that copies logical blocks of a file system upon a first write at the logical block level of the logical volume containing the file system, and the secondary data storage server could use a "write anywhere" snapshot copy facility 50 that always writes new file data to newly allocated file system blocks and links the newly allocated file system blocks to the inode of the file in the file system.

Figure 4:
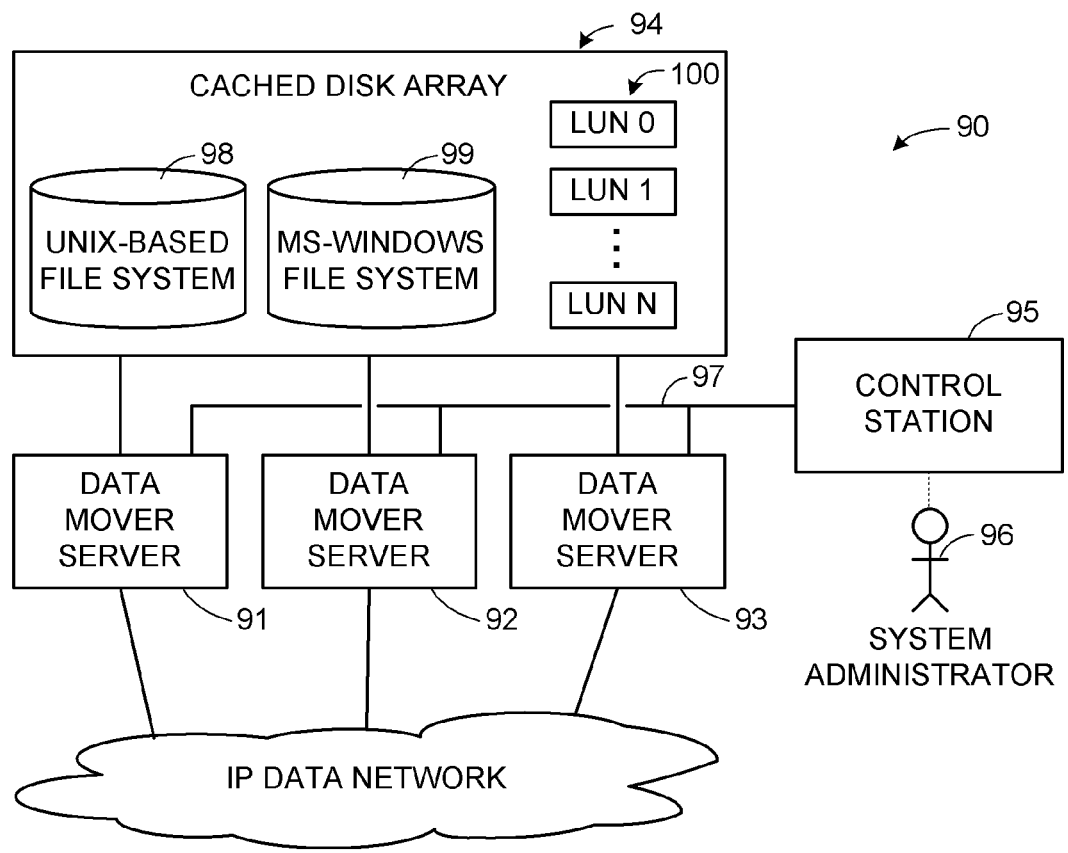
FIG. 4 is a block diagram of a network file server comprised of a cached disk array and multiple data mover servers sharing access to data storage of the cached disk array.

FIG. 4 shows that multiple primary servers 91, 92, 93 may share access to common storage such as a cached disk array 94. In FIG. 4, the primary servers 91, 92, 93 are data movers of a network file server generally designated 90, which may be constructed as described, for example, in Vahalia et al., U.S. Pat. No. 5,893,140, incorporated herein by reference; Xu et al., U.S. Pat. No. 6,324,581, incorporated herein by reference; and Liang et al, U.S. Patent Application Publication US 2005-0044162 A1 published Feb. 24, 2005, incorporated herein by reference. A control station 95 is connected via a dedicated dual-redundant data link 96 among the data movers 91, 92, 93 for configuring the data movers and the cached disk array 94. A system administrator 97 enters configuration information into the control station 95.

The cached disk array 94 may contain different kinds of data storage objects that are accessible by applications using different kinds of storage access protocols. For example, the cached disk array 94 is shown to contain a UNIX-based file system 98 accessible through the NFS protocol, a MS-Windows file system 99 accessible through the CIFS protocol, and set of storage LUNs 100 accessible through the iSCSI protocol. Because the data movers 91, 92, 93 share access to the cached disk array 94, the data movers can be programmed and configured to permit any network client to use any one of the data movers to provide read-write access to any of the data storage objects 98, 99, and 100. Alternatively, the data movers can be programmed and configured so that a particular data storage object in the cached disk array 94 is accessible to a client only through a particular one of the data movers.

Figure 5:
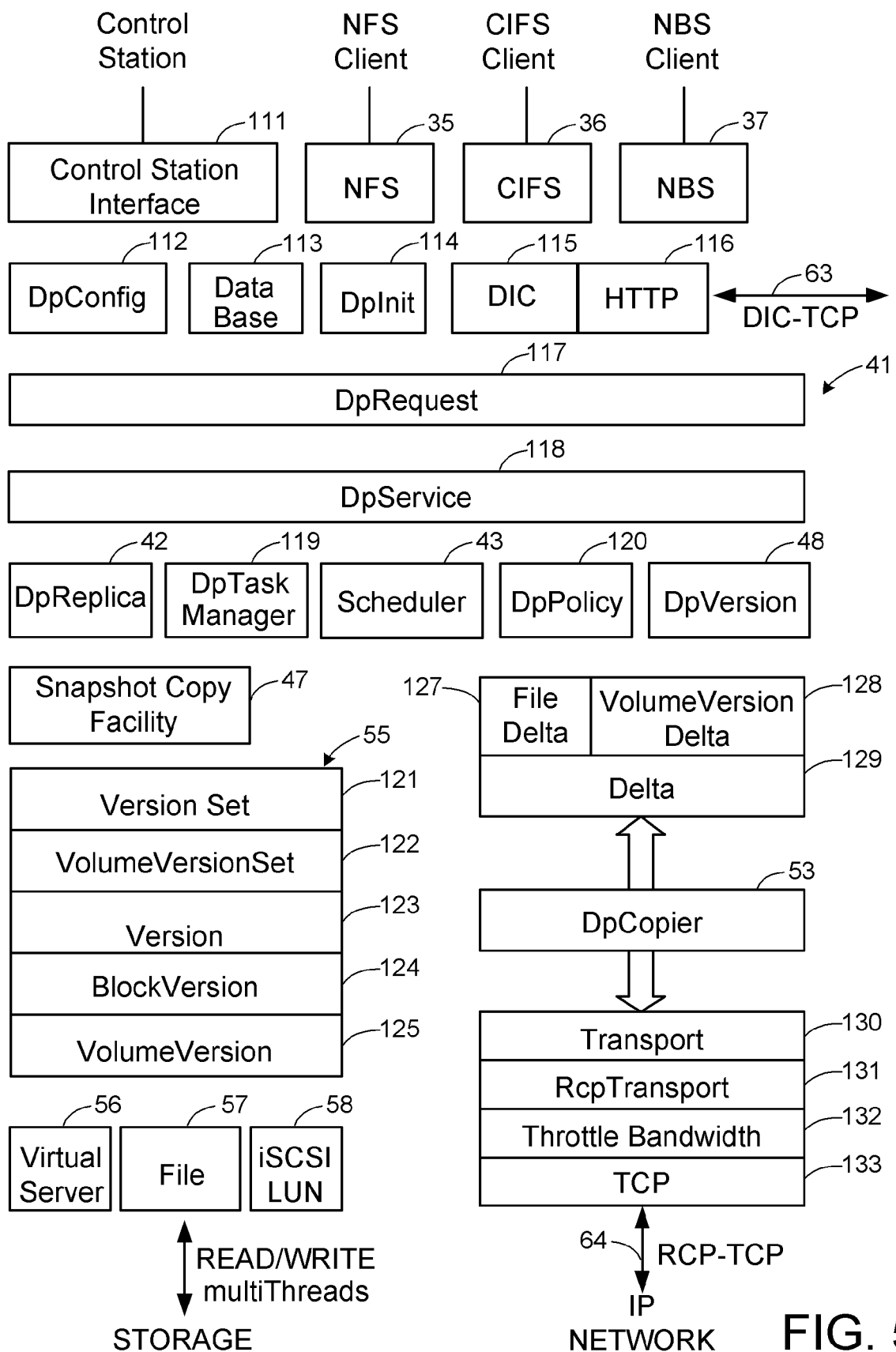
FIG. 5 is a block diagram showing computer software modules in each data mover server of the network file server of FIG. 4.

FIG. 5 is a block diagram showing computer software modules in each data mover server of the network file server of FIG. 4. Many of these software modules have already been introduced in FIG. 1. Additional software modules shown in FIG. 5 include a control station interface 111 for interfacing the control station (95 in FIG. 4) to the data mover, a DpConfig module 112 for configuring the data protection manager 41, a configuration data base 113, a DpInit module 114 for initializing the data protection manager, a data storage server interconnect control (DIC) module 115, and a HTTP client/server module 116 operating in connection with the DIC module for supporting the DIC-TCP connection 63.

In addition to the replication manager (DpReplica) 42 and the scheduler 43, the data protection manager 41 also includes a DpRequest module 117 for handling requests for data protection services, a DpService module 118 for servicing the data protection requests, a DP task manager 119, and a DP policy module 120.

The common version stack 55 includes a Version Set module 121, a Volume Version Set module 122, a Version module 123, a Block Version module 124, and a Volume Version module 125.

The copier module (DpCopier) 53 accesses a Delta module 129, which accesses a File Delta module 127 for replication of an individual file in a logical volume, or accesses a Volume Version Delta module 128 for replication of a logical volume. For transmission of the delta extents over the RCP-TCP connection 64, the copier module 53 accesses a transport stack including a transport module 130, an RCP transport module 131, a throttle bandwidth module 132, and a TCP module 133. The throttle bandwidth module 132 paces transmission of chunks of data over a TCP connection to use a specified bandwidth allocation, as further described below with reference to FIG. 22

Figure 6:
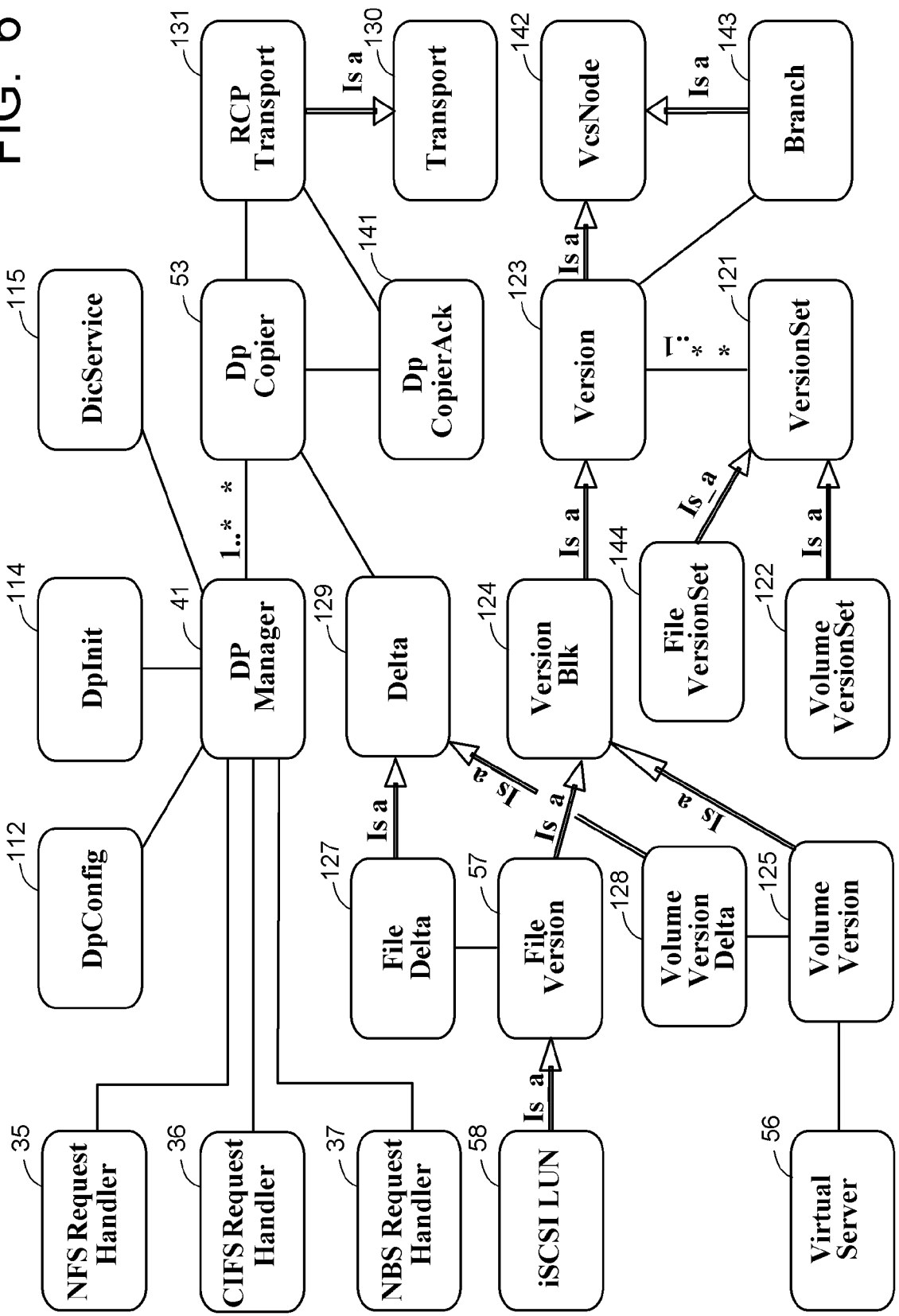
FIG. 6 is a class diagram of computer software modules introduced in FIG. 5.

FIG. 6 shows a class diagram of the software modules introduced in FIG. 5. The control station sends a configuration request to the DpConfig module 112 over HTTP encoded in XML format. The DpConfig module 112 parses the configuration request and passes it to the DP manager 41. Upon receipt of a reply from the DP manager 41, the DpConfig module 112 encodes the reply in XML and returns it to the control station over HTTP.

The DpInit module 114 is provided for recovering Data Protection objects such as Version Set, Replication and Task Session from an on-disk database maintained by each object. DpInit is started at reboot by a "dpinit" entry in a boot.cfg file. For each object to be recovered, a DpRequest is created and executed to recover an in-memory database. The DpInit module 114 calls the DicService module 115 to recover the database and to initialize a dispatcher. The DicService module 115 also can be called to record an event in the database.

The DpCopier module 53 functions as an interface between the Delta module 129 and the Transport module 130 to handle transfer of data. The DpCopier module 53 has a state machine called DpCopierSender for opening a transfer session, getting the data from the Delta module 129 and sending further to the Transport module 130. The DpCopier module 53 also has a state machine called DpCopierReceiver for receiving the data from the Transport module 130 and sending the data to the Delta module 129.

The DpCopier module 53 uses a DpCopierAck module 141 to handle acknowledgement of transferred data. The DpCopier Ack module 141 has a mechanism called DpCopierAckSender for receiving an acknowledgement from the Delta module 129 and sending further data to the Transport module 130. The DpCopier Ack module 141 also has a mechanism called DpCopierReceiver for receiving an acknowledgement from the Transport module 130 and updating the in-memory and on-disk database with a restart address required for re-starting transfer. A RcpTransport module 131 provides data transfer on an IP network using the RCP protocol. The Transport module 130 provides a generic interface for transferring data to various media. The Transport class is inherited by other classes that provide media specific implementation.

The FileVersion module 57 provides a snapshot of a file. The FileVersion class is derived from the class of the BlkVersion module 124 and implements the virtual functions defined in the Version module 123 and BlkVersion classes. The FileVersion module 57 carries out uncached I/O operations and getting or setting file attributes.

The FileDelta module 127 provides a mechanism for processing and consuming delta between two files. The FileDelta module 127 uses interfaces provided by the Delta module 129. In a processing mode, the Delta module 129 provides interfaces for building an extended table of blocks between two versions, reading data from a version, formatting data in the extended table, and inserting data in a queue. In a consuming mode, the Delta module 129 provides interfaces for formatting data, removing data from the queue, and writing the data.

The BlkVersion module 124 defines interfaces that apply to block devices. Two examples of block devices are volume and iSCSI LUN. The interfaces include uncached I/O interfaces, block size, and number of blocks.

The Version class is derived from a VcsNode class defined by a VcsNode module 142. Each Version object (production copy or snapshot) has a name and a reference count. A Version object also contains a list of Branches. A Version module 232 provides interfaces for getting or setting attributes (including opaque data that is used by Windows clients via CBMAPI).

A FileVersionSet module 144 uses a directory as the place holder for a collection of FileVersion objects. The FileVersionSet module 144 implements virtual functions defined in a VersionSet class. The FileVersionSet module 144 maintains the file handle of the directory and attributes table as private data.

VersionSet class represents a collection of Version objects. The VersionSet module 121 provides common interfaces to perform lookup, create, delete, restore, undo restore, commit restore and list versions operations. The VersionSet module 121 maintains an in-memory database and reference counter as protected data members and provides insertion and other helper methods as protected methods. The VersionSet module 121 provides a static data member for maintaining a list of all initialized VersionSet objects. It also defines a static method to initialize a VersionSet object given the VersionSetID.

A Branch class 143 is used internally to represent a branch node. It contains a list of Version objects that belong to the branch. The list may include a Version object for a temporary writable snapshot. In a specific implementation, the user may not create a version of a temporary writable snap, and instead the version list of a branch node has one node which is a temporary writable snap that the user may access.

Figure 7:
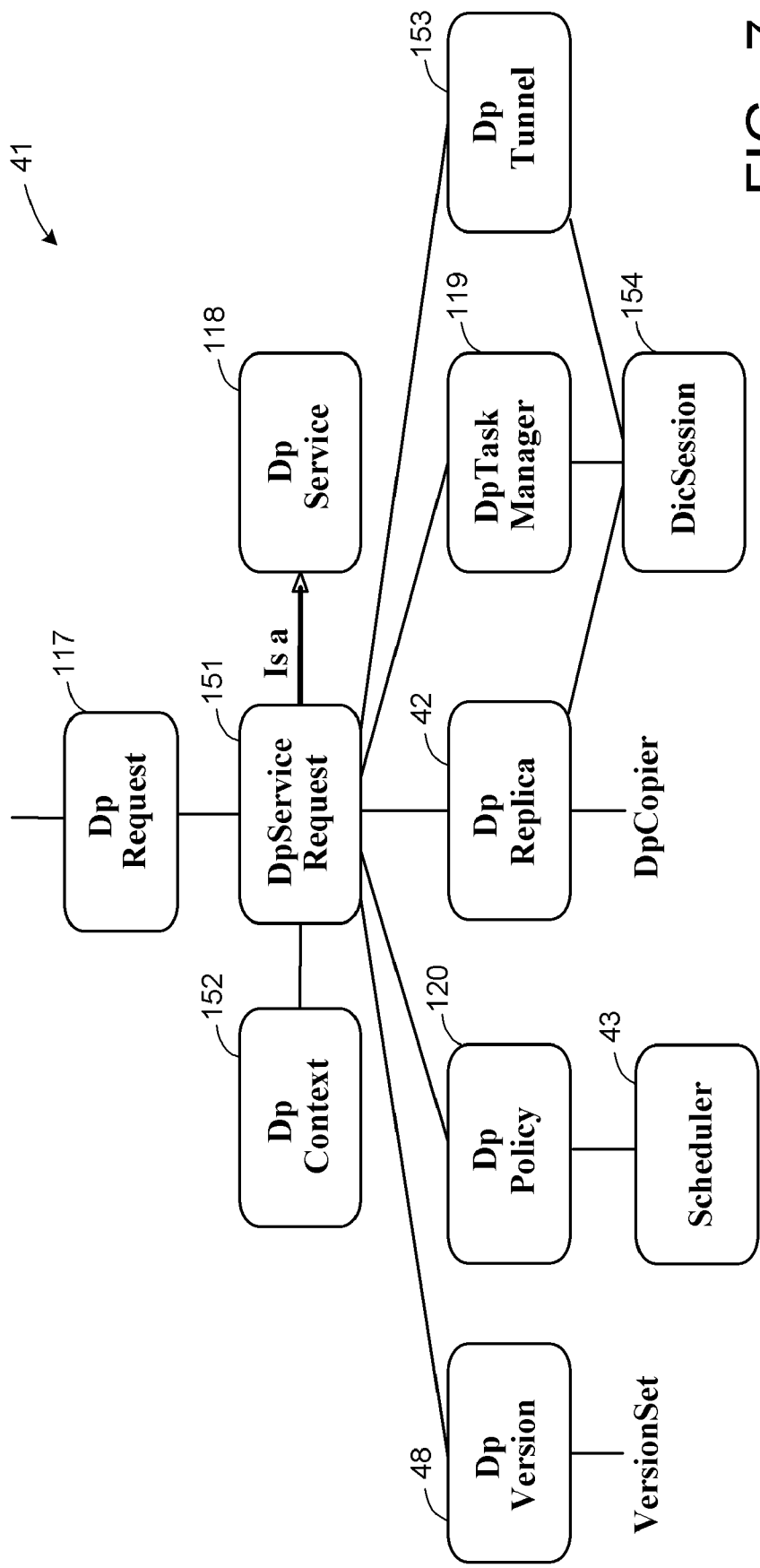
FIG. 7 is a class diagram of sub-modules comprising the DP Manager module introduced in FIG. 6.

FIG. 7 is a class diagram of software components of the DP manager (41 in FIG. 5). The software components include a DpRequest module 117. The DpRequest module 117 creates a DpRequest object for each data protection request received by the DP manager. The DpRequest class contains a request type (such as replica start, abort, request for information, version create, task failover, etc.), and a mode that is either synchronous or asynchronous. In the synchronous mode, the response is returned to the same thread that originated the request. In the asynchronous mode, for internally created operations, the response is returned to the caller but to a different thread. In the asynchronous mode, for externally created operations, the response is returned using notification. The DpRequest class further contains a caller or initiator of the request, a data structure with defined input and output parameters, and a service object initialized to handle the request. The DpRequest object is deleted by initiator of the request. The DpRequest module 117 provides an interface named "executeCmd( )" for executing a request and an interface named "completeCmd( )" for completing a request after it has been executed.

The DP manager includes a DpService module 118 providing a general interface between the DpRequest module 117 and corresponding Dp objects for the particular DpRequest type. The Dp objects are stored in an in-memory database accessed by a DpContext module 152 to keep track of requests in progress. Each DpService type is a single instance. The DpRequest module 117 calls the interface executeCmd(DpRequest*) to find and call objects responsible for processing of a request. After the request is processed, the DpRequest module 117 calls the interface completeCmd(DpRequest*) to update the in-memory database and return a reply to the originator of the request.

For example, a ReplicaStart request starts a replication session on the primary data move and the secondary data mover. The request is initiated by the NBS request handler (37 in FIG. 6), the DpConfig module (112 in FIG. 6) or the DpTaskManager module (119 in FIG. 5). The DpService module 118 calls an interface of a DpServiceRequest module 151 called "DpService ReplicaStart" to cerate a DpReplica instance, update the in-memory database, populate any missing parameters, and pass the request to the DpReplica module 42. At completion with success status, a DpPolicy module 120 is called to register the success and signature stamp the VersionSet. At completion with failure status, the session is removed from the in-memory database.

For example, a ReplicaMark request is processed to mark a snapshot to be replicated. The request is initiated by the NBS request handler (37 in FIG. 6) or the DpConfig module (112 in FIG. 6). The DP service module 118 calls an interface "DpService ReplicaMark" of the DpServiceRequest module 151 to pass the request to the DpReplica module 42. At completion no further operation is required by DpService.

One instance of the DpReplica class is created on the primary data mover and the secondary data mover for a particular replication session. The DpReplica module provides a mechanism to configure a session to establish remote connection for a control and a data path, to manage transfer of snapshots from the primary data mover to the secondary data mover, to provide consistency between the primary data mover and the secondary data mover, and to maintain the on-disk database for persistency on reboot.

One instance of the DpPolicy class is created per Version Set. All replication sessions running on same Version Set are sharing the same DpPolicy object. The DpPolicy module 120 provides a PolicyScheduler mechanism using the scheduler 43 for driving the transfer of snapshots to be replicated. The PolicyScheduler controls the number of transfers in progress from the primary data mover to the secondary data mover. Transfer is scheduled by the scheduler 43 on first come first served basis. There is a single instance of PolicyScheduler per data mover. The PolicyScheduler maintains a list of snapshots for each replication session based on mark and unmark operations in the in-memory and on-disk database. The Policy- Scheduler also protects from deletion the snapshot delta in transfer and the base snapshot on the primary data mover and the secondary data mover.

A DpVersion object is created per Version Set. A DP Version module 48 provides an interface for accessing Version Set interfaces. The DP Version module 48 maintains the on-disk database to provide persistency at reboot.

The DpTaskManager module 119 provides a mechanism for handling specific commands running on top of the replication session such as failover and copy reverse. Failover aborts a replication session, sets a copy in the secondary data mover to production in read/write mode and sets the source of the copy in the primary data mover to read-only mode. Copy Reverse copies a snapshot from the secondary data mover back to the primary data mover. A DpTaskManager object is created just for the time of the currently running operation. The object is maintained in the on-disk database to provide persistency at reboot.

A DpTunnel module 153 provides a generic interface for sending requests between the primary data mover and the secondary data mover and returning the corresponding response. It supports only synchronous mode and no persistency at reboot. Operations handled by the DpTunnel module 153 are ValidateIp, VersionCreate, VersionCreateBranch, VersionDelete, VersionGetAttribute, VersionGetOpaqueData, VersionSetOpaqueData, VersionPromote, VersionDemote and VersionList. The DpTunnel module 153 provides a DpTunnelDicService interface for processing and replying to simple requests between the primary and secondary data movers in synchronous mode. The DpTunnel module 153 also provides a DpTunnelDicMsgService interface for processing and replying to multiple block requests between the primary and secondary data movers in synchronous mode. The DpTunnel module 153, the DpTask Manager module 119, and the DP Replica module 42 use a DicSession module 154 for communication over a DIC-TCP connection.

Figure 8:
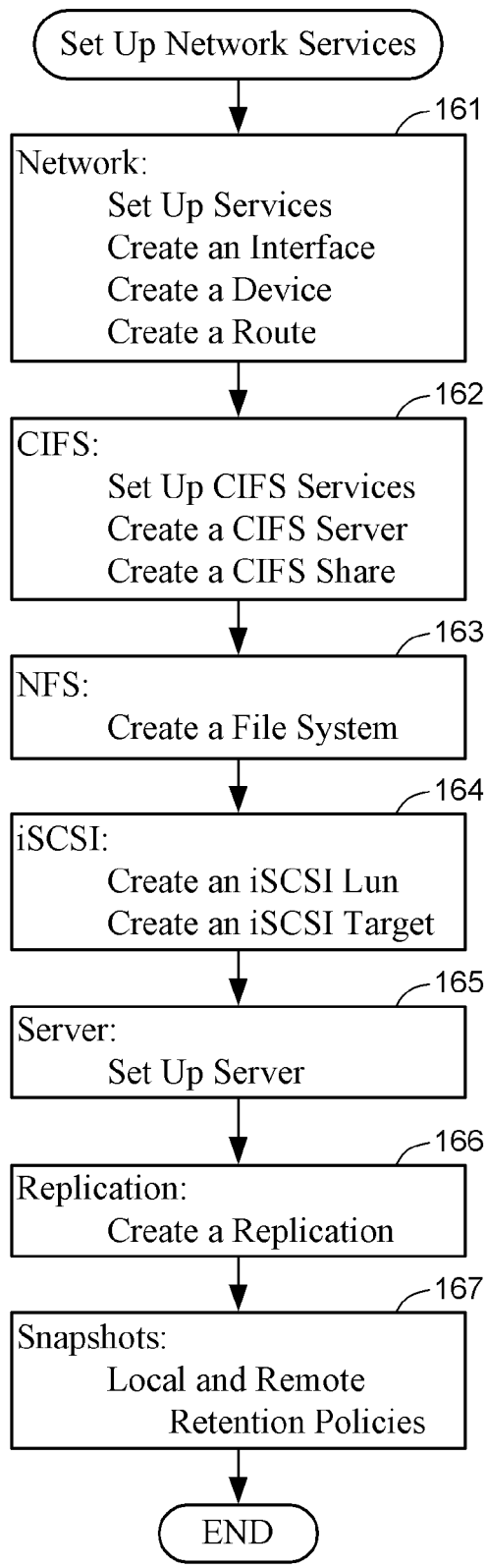
FIG. 8 is a flowchart of a procedure used by a system administrator at a control station in FIG. 4 for setting up network services including replication and snapshot services.

FIG. 8 shows a procedure for setting up network services. This procedure, for example, is implemented by a graphical user interface (GUI) at the control station 95 in FIG. 4. The GUI presents a series of display screens to the system administrator, and the display screens offer various choices, as indicated by the text in the boxes in FIG. 8.

In a first step 161 of FIG. 8, the system administrator may configure the network by setting up services, creating an interface to the network, creating a device in the network, and creating a route in the network. Once an interface from a data mover to the network is configured, the cached disk array may also explore the network to locate devices and routes already present in the network.

In step 162, the system administrator may set up CIFS services on a selected one of the data movers (91, 92, 93 in FIG. 4) by creating at least one CIFS server on the selected data mover and at least one CIFS share accessible to network clients via the selected data mover. In step 163, the system administrator may create a NFS file system accessible to network clients via a selected one of the data movers. In step 164, the system administrator may create an iSCSI LUN and an iSCSI target accessible to network clients via a selected one of the data movers. In step 165, the system administrator may further configure a selected one of the data movers, for example, by setting client authentication credentials, access privileges, and quotas. In step 166, the system administrator may create a replication session, as further described below with reference to FIG. 9. Finally, in step 167, the client may set up different local and remote retention policies for snapshots. The enforcement of a local or remote snapshot retention policy is further described below with reference to FIG. 10.

Figure 9:
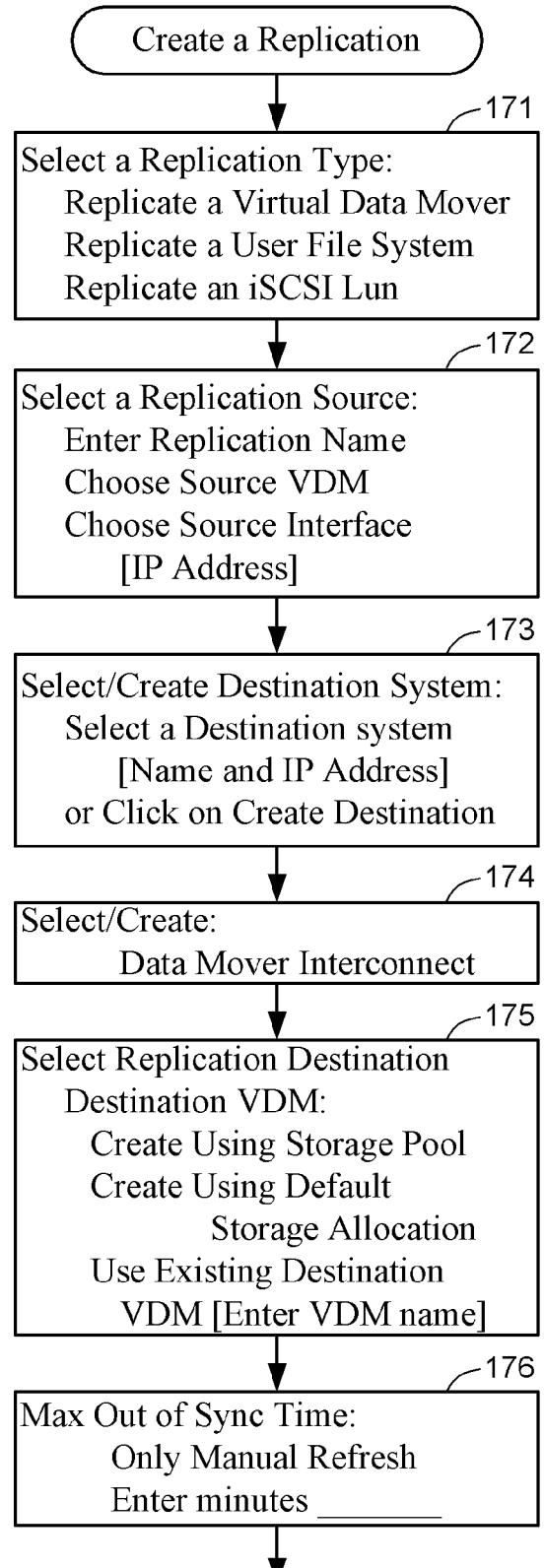
FIG. 9 is a flowchart of a procedure used by the system administrator at the control station in FIG. 4 for creating a replication session.

FIG. 9 shows a procedure for creating a replication session between a primary data storage server and a secondary data storage server. This procedure, for example, is implemented by a graphical user interface (GUI) at the control station 95 in FIG. 4. The GUI presents a series of display screens to the system administrator, and the display screens offer various choices, as indicated by the text in the boxes in FIG. 9.

In a first step 171 of FIG. 9, the system administrator selects a type of data storage object to be replicated, such as a virtual data mover, a user file system, or an iSCSI LUN. In step 172, the system administrator selects a replication source by entering a name for the replication session, choosing a source virtual data mover (VDM), and choosing a source interface by specifying a source IP address. This source IP address is used as the source IP address for the DIC-TCP connection and the RCP-TCP connection for the replication session. In step 173, the system administrator selects or creates the destination system for the replication session, so that a destination name and a destination IP address becomes associated with the replication session. The destination IP address is used as the destination IP address for the DIC-TCP connection and the RCP-TCP connection for the replication session. In step 174, the DIC-TCP connection is established, so that the system administrator may remotely configure the destination for receiving and remotely storing data replicated over the RCP-TCP connection. In step 175, the system administrator may select or cerate a destination virtual data mover (VDM) in the secondary data storage server, and may allocate secondary data storage for storing the replicated data and remote snapshot copies.

Finally, in step 176, the system administrator either selects a "manual refresh" option, or specifies a "max out of sync" time in minutes. A "manual refresh" results in a remote copy of the data storage object that is updated to the state of the local production copy at the time that the "manual refresh" is requested. Such a "manual refresh" can be requested any number of times during the replication session. If the system administrator specifies a "max out of sync" time, then the replication process will keep a remote copy of the data storage object that is out of sync with the local production copy by no more than the "max out of sync" time, taking into account not only the time to transmit the replicated data from the primary data storage server to the secondary data storage server, but also the time required to process the delta and read it from the primary in addition to the time required to write the replicated data into the secondary data storage at the destination. The "max out of sync" time can have preset limits, such as a minimum value of 1 minute and a maximum value of 1440 minutes (i.e., 24 hours).

Figure 10:
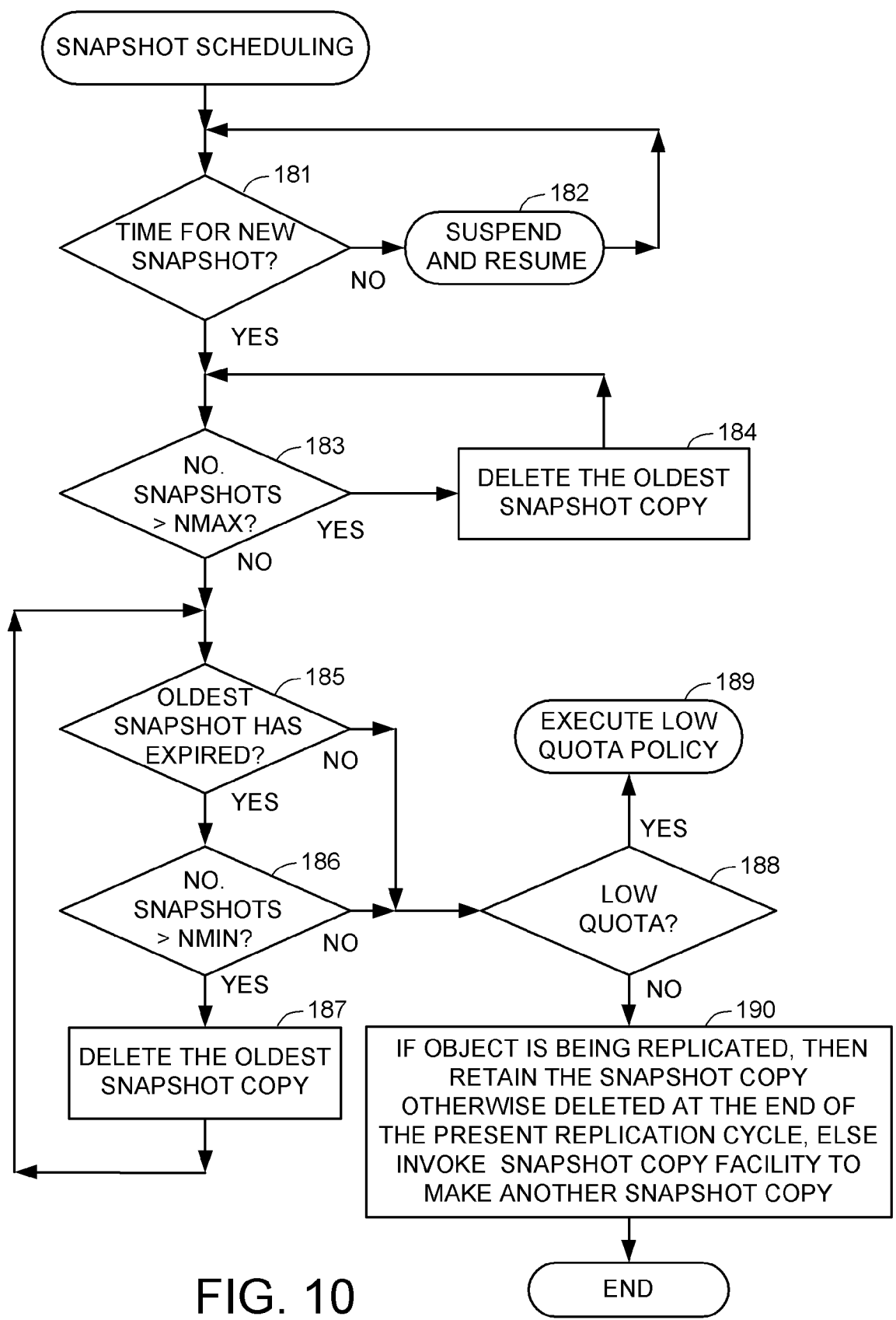
FIG. 10 is a flowchart of a procedure for snapshot scheduling.

FIG. 10 shows the scheduling of local or remote snapshot creation and retention. The local or remote snapshot policy, for example, defines a snapshot creation interval (e.g., hourly, daily, weekly), an attribute NMAX, specifying a maximum number of snapshots; an attribute MAXAGE, specifying an expiration age of a snapshot (e.g., in terms of a specified number of hours, days, weeks, months, years, or some combination thereof); an attribute NMIN, specifying a minimum number of expired snapshots to keep; and a "low quota" policy to execute in the event that the available free storage has become less than a specified fraction (such as 10%) of a storage quota applicable to the data storage object to be snapshot copied. Initially, the snapshot policy attributes have default values such as infinite values for NMAX and MAXAGE, and a value of 1 for NMIN. The low quota policy, for example, is to delete the oldest snapshot, send a warning message to the system administrator, and continue with snapshot creation. The default remote snapshot policy is to follow the local snapshot policy. In other words, in the absence of a remote snapshot policy being explicitly defined for the replication session, the local snapshot policy is replicated from the primary data storage server to the secondary data storage server.

In a first step 181 of FIG. 10, the scheduler checks whether it is time for a new snapshot in accordance with the snapshot creation interval for the data storage object to be snapshot copied. If not, then the scheduler is suspended in step 182 and resumes at a later time. Once it is time for a new snapshot, execution continues from step 181 to step 183. In step 183, if the number of snapshots for the pass-through write file is greater than NMAX, then execution branches to step 184. In step 184, the oldest snapshot copy of the data storage object is deleted. This involves deletion of any data blocks of the oldest snapshot copy that are not shared with the production version or any other snapshot copy of the data storage object. From step 184, execution loops back to step 183. Once the number of snapshot copies of the data storage object is no longer greater than NMAX, execution continues from step 183 to step 185. In step 185, if the oldest snapshot copy of the data storage object has expired, execution continues to step 186. The oldest snapshot has expired if its age (i.e., the difference between the present time and the creation time of the snapshot) exceeds MAXAGE for snapshots of the data storage object. In step 186, if the number of snapshots is greater than NMIN, then execution continues to step 187 to delete the oldest snapshot copy of the data storage object. Execution loops back to step 185. Once the oldest remaining snapshot copy has not expired, as found in step 185, or the number of snapshots is not greater than NMIN, as found in step 186, execution branches to step 188.

In step 188, if there is a storage quota applicable to the data storage object to be snapshot copied, then the free storage space for allocation to the storage object is compared to a specified fraction of the storage quota, and if the free storage space is less than this specified fraction of the storage quota, execution branches to step 189 to execute a predetermined "low quota" policy for the data storage object. Otherwise, execution continues from step 188 to step 190. In step 190, if the object is currently being replicated, then the snapshot copy is retained that is otherwise deleted at the end of the current replication cycle. If the object is not currently being replicated, then the snapshot copy facility is invoked to make another snapshot copy of the data storage object.

There can be multiple destinations for replication of the same data storage object from the same primary data storage server. For example, if a replication session is requested from the same source to a different destination as an existing session, then a new replication session will be started but it will share the same source data. A different remote snapshot policy can be enforced at each destination. The replication manager in the primary data storage server will recognize the new replication session and the existing replication session as belonging to a combined one-to-many replication process. In this way multiple replication sessions from the same source can be done more efficiently by sharing the same source data.

Replication sessions can be associated with jobs. There can be jobs that are just local on the primary, for example to create snapshots on the primary that are not replicated. There can be jobs that establish multiple replication sessions, for a one-to-many replication. For example:

Job 1 (Rep Session 0)
Job 2 (Rep Session 1, Rep Session 2)
Job 3 (Local Snapshot Creation)

In this example, if Rep Session 1 and Rep Session 2 have the same source data, then Job 2 will be recognized as a one-to-many replication process.

Figure 11:
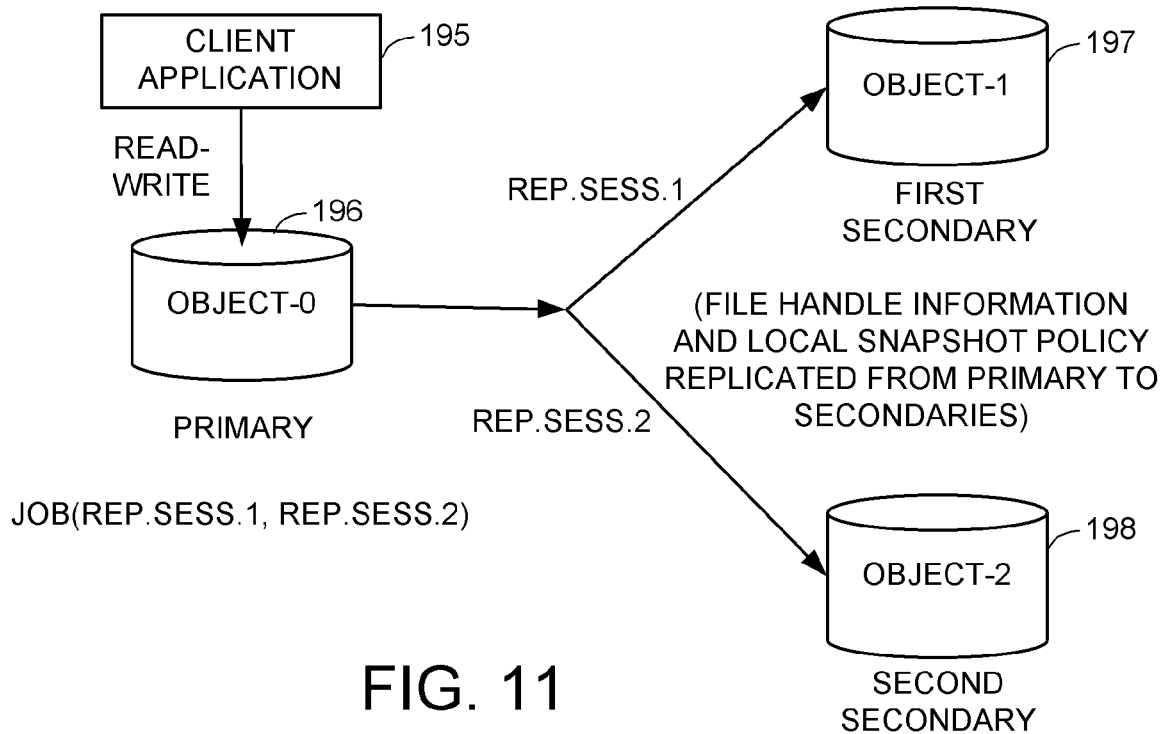
FIG. 11 is a flow diagram showing a one-to-many replication.

FIG. 11 shows an example in which a client application 195 performs read-write transactions upon an object-0 in primary storage 196, and a one-to-many replication job replicates the changes upon object-0 to object-1 in first secondary storage 197 and also to object-2 in second secondary storage 198. (In this example, object-0, object-1, and object-2 represent three distinct copies of the same data storage object.) The local snapshot policy in the primary is replicated from the primary to the secondaries by default. In addition, file handle information can be replicated from the primary to the secondaries, as further described below with reference to FIGS. 23-25, so that file handles issued by the primary to network clients can be used by the network clients for directly accessing the remote copies in the secondaries.

Figure 12:
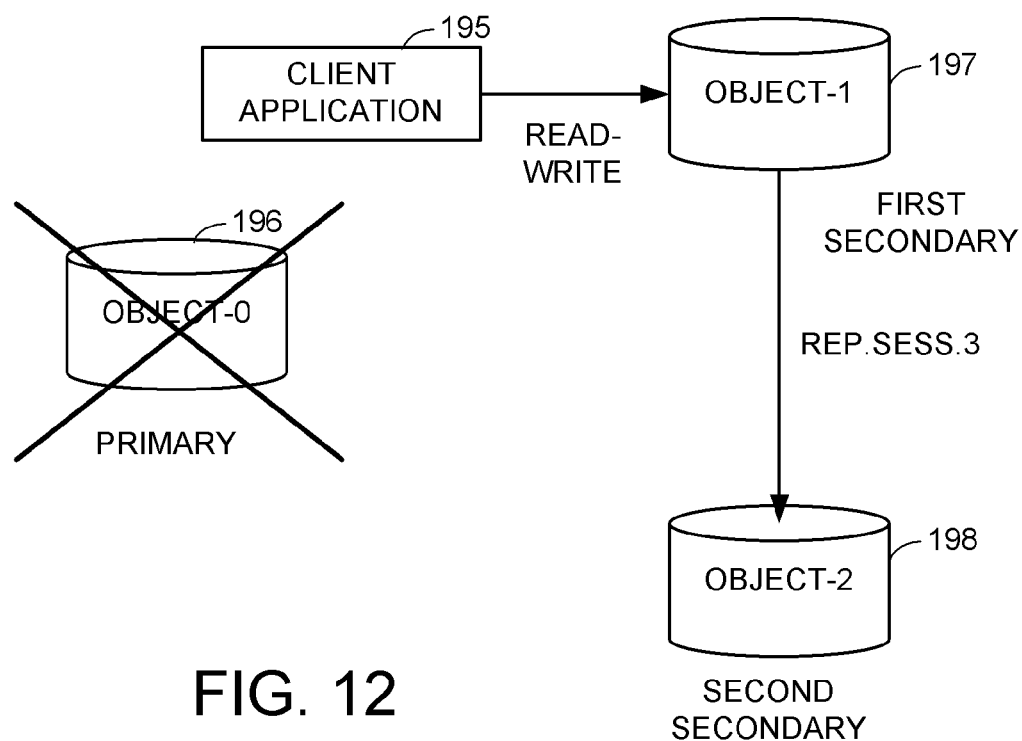
FIG. 12 is a flow diagram showing failover from a primary data storage server to a secondary data storage server after an interruption of the one-to-many replication of FIG. 11.

As shown in FIG. 12, when the primary fails, then fail-over occurs to the first secondary storage so that the client application 195 resumes transaction processing upon object-1 in the first secondary storage 197, and a replication session (Rep.Sess.3) is established automatically to resume replication of changes to object-2 in the secondary storage. Thus, the first secondary storage becomes primary with respect to the object.

In the fail-over example of FIGS. 11 and 12, the asynchronous nature of the replication over IP can complicate the recovery of transaction processing unless transaction processing resumes from a snapshot, which is a consistent state of the object. In order to facilitate recovery from the most recent snapshot in the first secondary 197 or the second secondary 198, each snapshot has a unique signature ID. So after a failure of the primary, the first secondary and the second secondary can communicate to find the most recent snapshot in the secondary storage 197 and 198, and transaction processing can be restarted there. So that both of the first and second secondaries are synchronized to the most recent snapshot of the object prior to the restart of transaction processing, it is further desirable for the two secondaries to communicate with each other for finding the most recent common base snapshot copy that resides in both the first secondary storage 197 and the second secondary storage 198. Upon finding the most recent common base snapshot, the secondary having the most recent snapshot copy can send changes since the most recent common base snapshot to the other secondary so that the desired synchronization is achieved prior to restart of the transaction processing by the client application.

Figure 13:
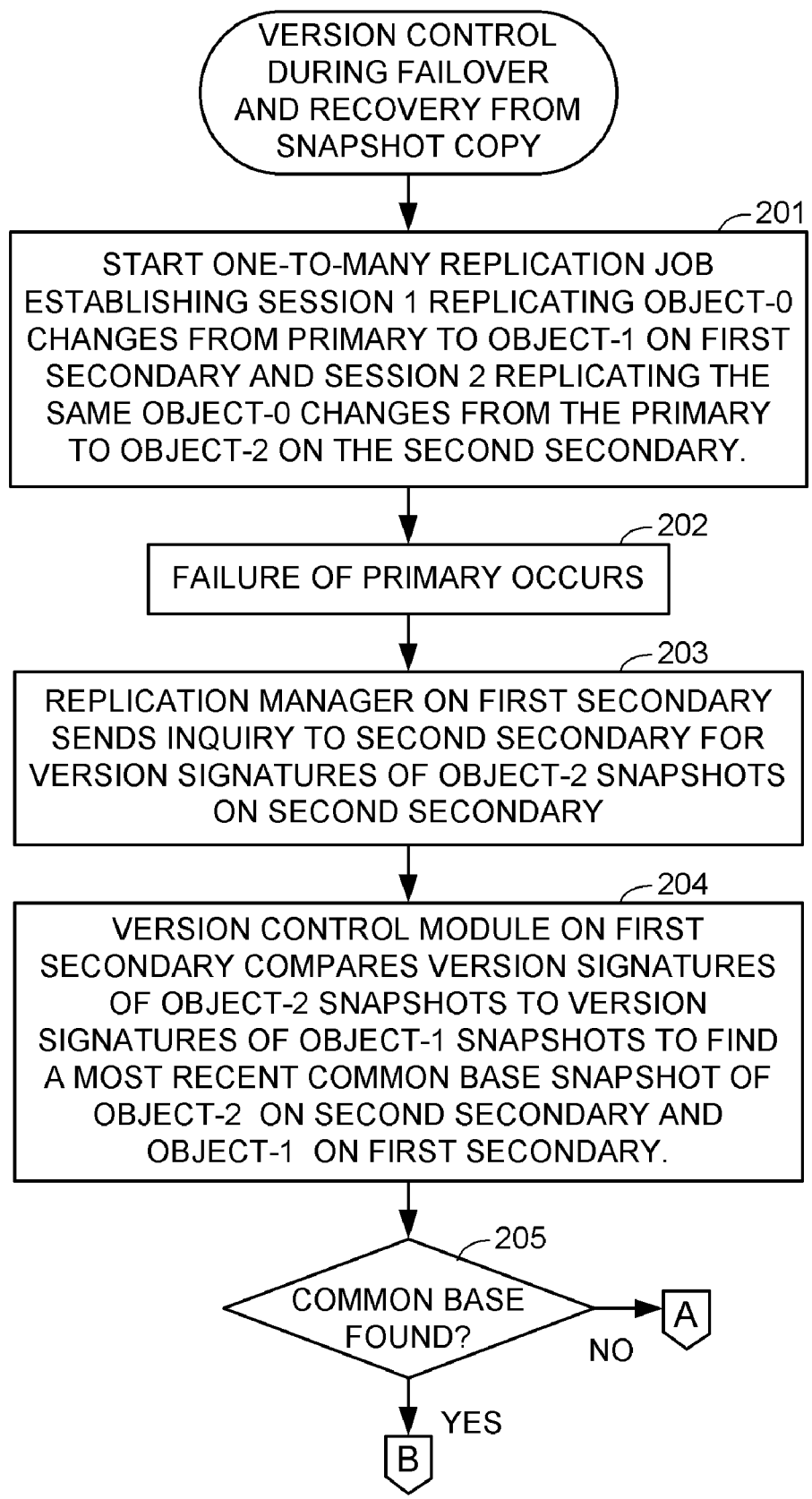
FIGS. 13 to 15 comprise a flowchart of version control that may be used during failover from a one-to-many replication as shown in FIG. 12.
Figure 14:
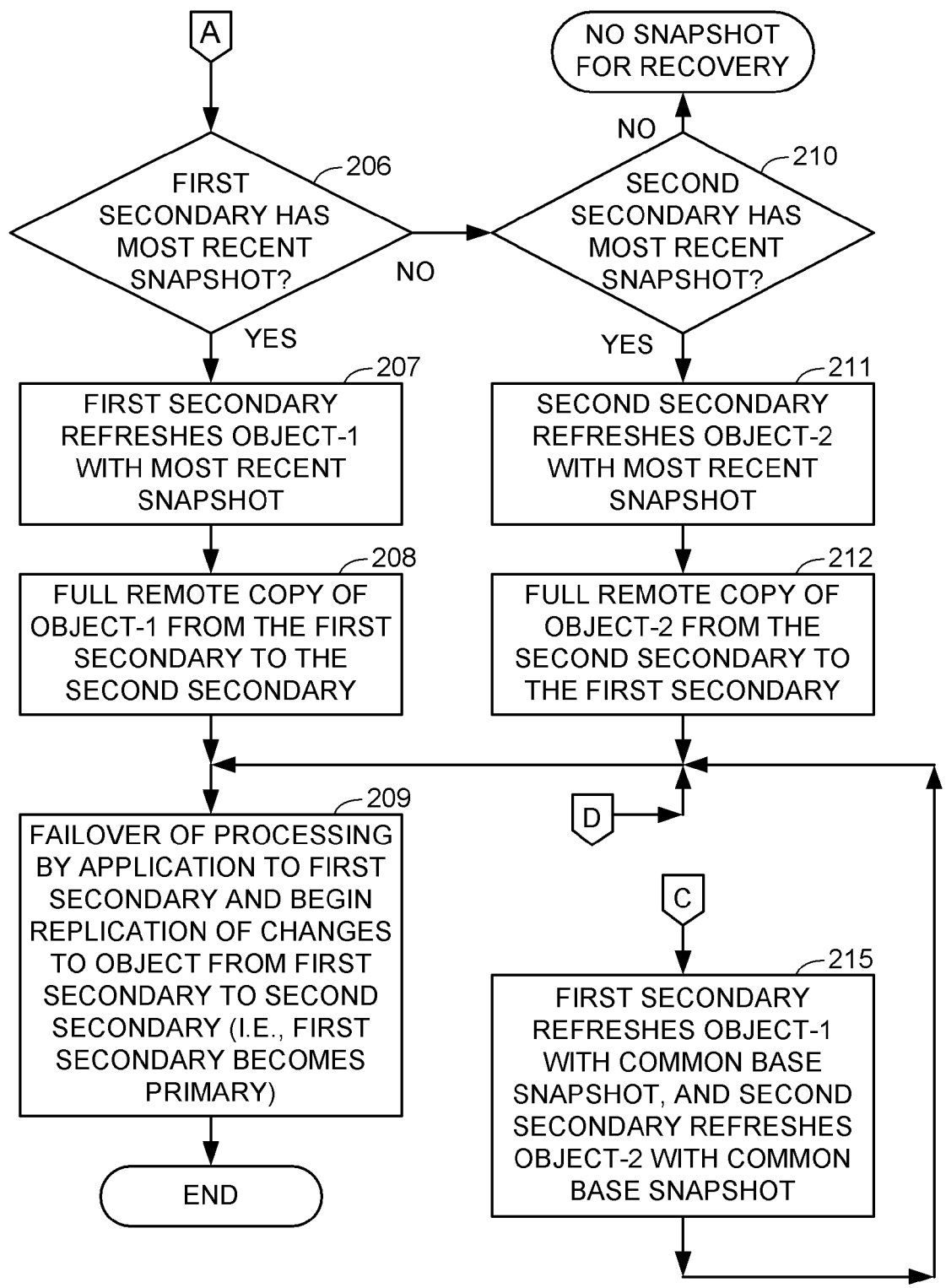
Figure 15:
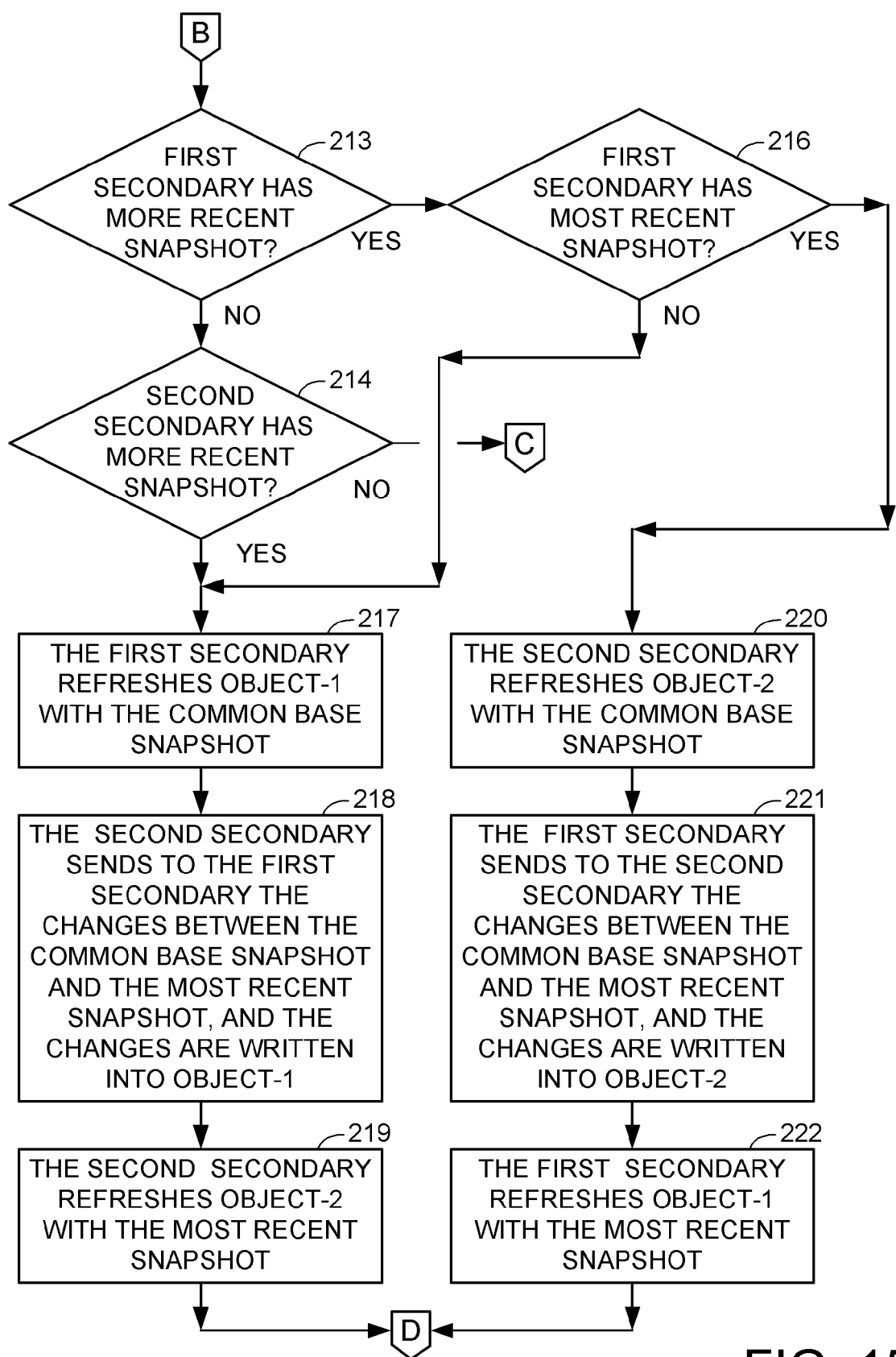

FIGS. 13 to 15 show a more specific procedure for version control during failover to the first secondary and recovery of transaction processing by the client application in the example of FIGS. 11 to 12. In a first step 201 of FIG. 13, the primary starts a one-to-many replication job establishing session 1 replicating object-0 changes from the primary to object-1 on the first secondary and session 2 replicating the same object-0 changes from the primary to object-2 on the second secondary. Next, in step 202, failure of the primary occurs. Then in step 203, the replication manager on the first secondary sends an inquiry to the second secondary for version signatures of object-2 snapshots on the second secondary. In step 204, the version control module on the first secondary compares version signatures of object-2 snapshots to version signatures of object snapshots to version signatures of object-1 snapshots to find a most recent common base snapshot of object 2 on the second secondary and object-1 on the first secondary. In step 205, if a common base snapshot is not found, execution continues to step 206 in FIG. 14.

In step 206 in FIG. 14, if the first secondary has the most recent snapshot, then execution continues to step 207. In step 207, the first secondary refreshes object-1 with the most recent snapshot. Then in step 208, the first secondary performs a full remote copy of object-1 from the first secondary to the second secondary, so that object-2 on the second secondary is replaced with this full remote copy of object-1. Then in step 209, transaction processing by the client application is failed-over to the first secondary and changes to the object in the first secondary are replicated to the second secondary. In other words, the first secondary becomes primary and resumes the process of replicating changes to the second secondary.

In step 206, if the first secondary does not have the most recent snapshot of the object, then execution branches to step 210. In step 210, if the second secondary does not have the most recent snapshot of the object, then the recovery process is terminated because there is no snapshot of the object in secondary storage for recovery of transaction processing by the application. If the second secondary has the most recent snapshot of the object, then execution continues from step 210 to step 211. In step 211, the second secondary refreshes object-2 with the most recent snapshot. Then in step 212 the second secondary performs a full remote copy of object-2 from the second secondary to the first secondary, so that object-1 on the first secondary is replaced with this full remote copy of object-2. Execution then continues from step 212 to step 209 so that transaction processing by the application resumes at the first secondary upon the full remote copy of object-2, and the first secondary replicates change of the object to the second secondary.

In step 205 of FIG. 13, if a common base snapshot is found, then execution continues to step 213 of FIG. 15. In step 213, if the first secondary does not have a more recent snapshot of the object, then execution continues to step 214. If the second secondary does not have a more recent snapshot of the object, then execution branches from step 214 to step 215 in FIG. 14. In this case, the most recent snapshot of the object is the common base snapshot. Therefore, in step 215, the first secondary refreshes object-1 with the common base snapshot, and the second secondary refreshes object-2 with the common base snapshot. Then execution continues to step 209 so that transaction processing by the application resumes at the first secondary upon the most recent common base snapshot, and the first secondary replicates changes of the object to the second secondary.

In step 214 of FIG. 15, if the second secondary has the more recent snapshot of the object, then execution continues to step 217 of FIG. 15. Execution also continues to step 217 from step 216 for the case where the first secondary has a more recent snapshot of the object than the most recent common base snapshot, but nevertheless the first secondary does not have the most recent snapshot of the object because the second secondary has the most recent snapshot of the object. In step 217, the first secondary refreshes object-1 with the most recent common base snapshot. Then in step 218 the second secondary sends to the first secondary the changes between the common base snapshot and the most recent snapshot of the object, and the changes are written into object-1. Then in step 219 the second secondary refreshes object-2 with the most recent snapshot of the object. From step 219, execution continues to step 209 of FIG. 14 so that transaction processing by the application resumes at the first secondary upon the most recent snapshot of the object, and the first secondary replicates changes of the object to the second secondary.

In step 213 of FIG. 15, if the first secondary has the more recent snapshot of the object, then execution continues to step 216. In step 216, if the first secondary has the most recent snapshot of the object, then execution continues to step 220. In step 220, the second secondary refreshes object-2 with the most recent common base snapshot. Then in step 221, the first secondary sends to the second secondary the changes between the common base snapshot and the most recent snapshot of the object, and the changes are written into object-2. Then in step 222, the first secondary refreshes object-1 with the most recent snapshot of the object. From step 222, execution continues to step 209 of FIG. 14 so that transaction processing by the application resumes at the first secondary upon the most recent snapshot of the object, and the first secondary replicates changes of the object to the second secondary.

FIGS. 11 to 15 show one example in which the replication of a data storage object in general involves synchronizing a snapshot copy of the data storage object in the secondary to a snapshot copy of the data storage object in the primary, and then replicating changes to the data storage object since this snapshot copy from the primary to the secondary. The initial process of synchronizing a snapshot copy of the data storage object in the secondary to a snapshot copy of the data storage object in the primary will be referred to as "replication configuration." Replication configuration for the data processing system of FIG. 1 is shown in the flowchart of FIG. 16.

Figure 16:
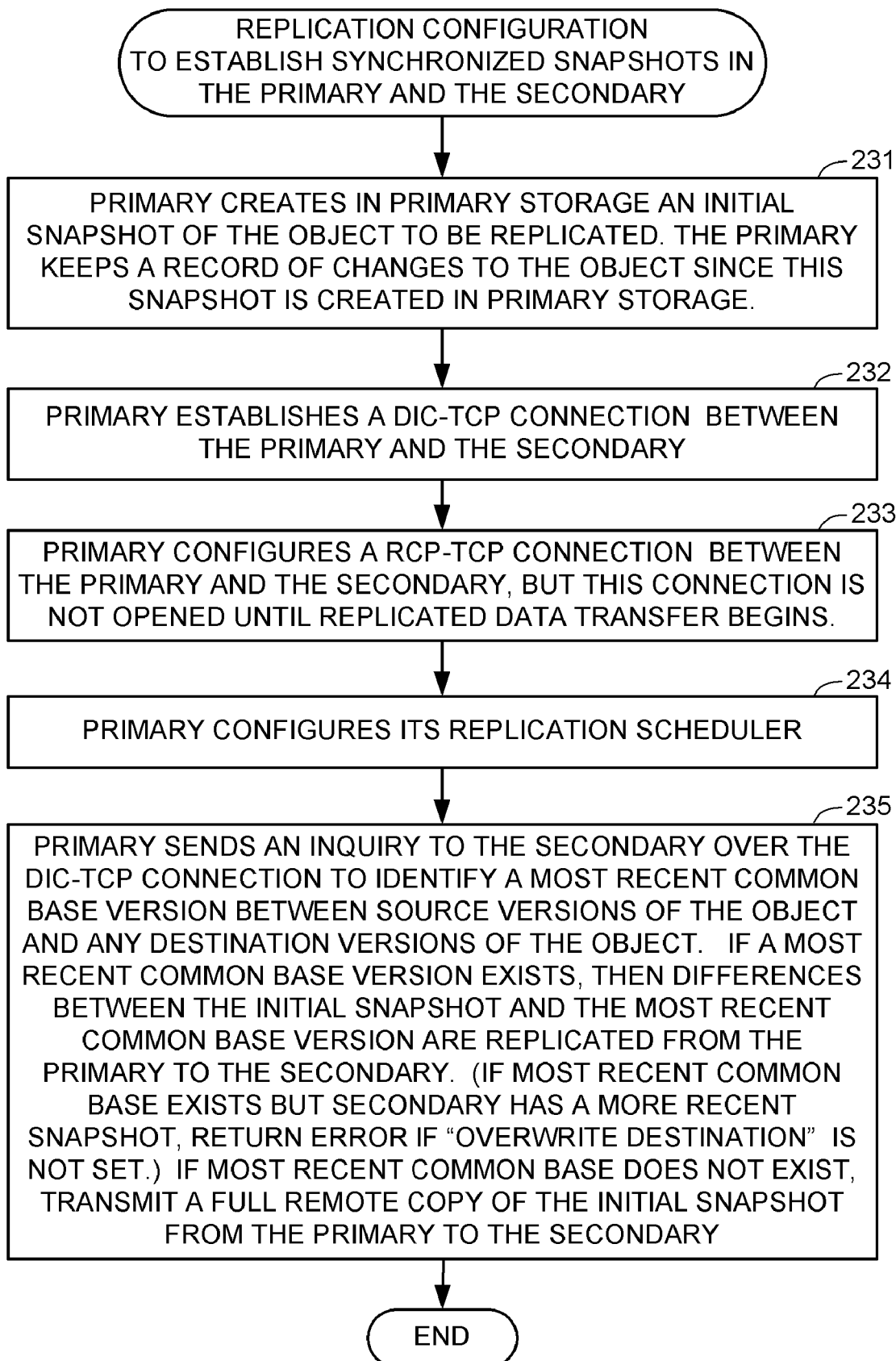
FIG. 16 is a flowchart of replication configuration to establish synchronized snapshots in primary storage and secondary storage in order to permit replication by transmission of a difference between snapshots.

In a first step 231 of FIG. 16, the primary data storage server creates in the primary storage an initial snapshot of the object to be replicated. The primary keeps a record of changes to this object since this snapshot is created in primary storage. These changes are kept in a data structure in primary storage associated with a production version of the object. In step 232, the primary data storage server establishes a DIC-TCP connection between the primary and the secondary data storage server. In step 233, the primary configures a RCP-TCP connection between the primary and the secondary, but this RCP-TCP connection is not opened until replicated data transfer begins. In step 234, the primary configures it replication scheduler. In step 235, the primary sends an inquiry to the secondary over the DIC-TCP connection to identify a most recent common base version between source versions of the object and any destination versions of the object. If a most recent common base version exists, then the differences between the initial snapshot and the most recent common vase version are replicated from the primary to the secondary. (If the most recent common base exists but the secondary has a more recent snapshot, then an error is returned if an "overwrite destination" option is not set.) If a most recent common base does not exist, then a full remote copy of the initial snapshot is transmitted from the primary to the secondary.

Figure 17:
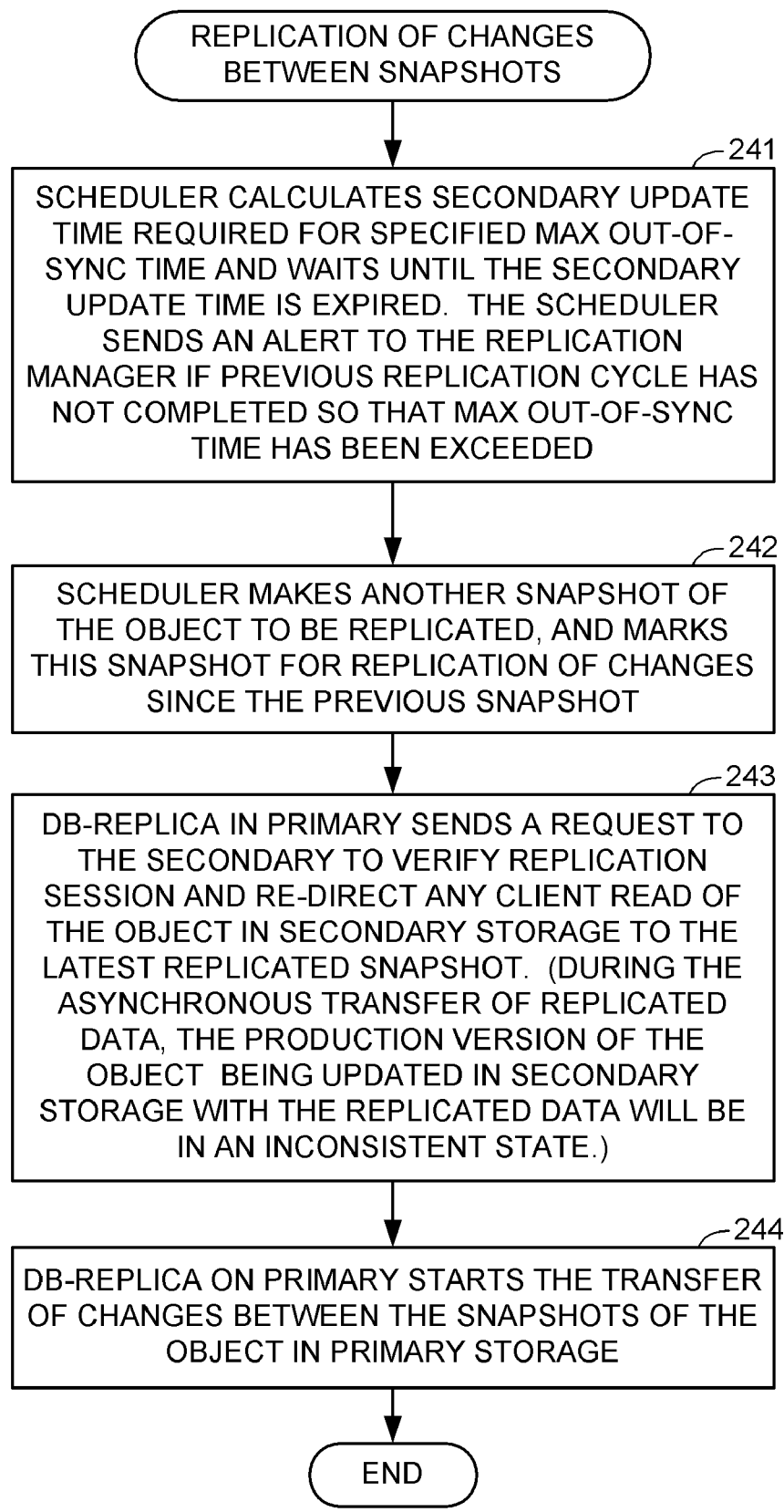
FIG. 17 is a flowchart of replication of changes between snapshots.

FIG. 17 shows replication of changes between two snapshots in primary storage. In a first step 241, the scheduler calculates a secondary update time required for the specified max out-of sync time and waits until the secondary update time is expired. The scheduler sends an alert to the replication manager if the previous replication cycle has not completed by that time because this would indicate that the max out-of-sync time for the previous cycle has been exceeded. In step 242 the scheduler makes another snapshot copy of the object to be replicated, and marks this snapshot for replication of changes since the previous snapshot. In step 243, the DB-Replica module in the primary sends a request to the secondary to verify the replication session and re-direct any client read of the object in the secondary storage to the latest replicated snapshot. The client read is redirected because during the asynchronous transfer of replicated data to the production version in the secondary storage, the production version in the secondary storage will be in an inconsistent state until all of the differences between the two snapshot versions of the object in primary storage have been written into the production version in the secondary storage. Finally, in step 244, the DB-Replica module in the primary starts the transfer of charges between the snapshots of the object in the primary storage.

In practice, the steps of FIG. 17 comprise a single replication cycle that is repeated periodically for a replication session at a rate that is the reciprocal of the max out-of-sync time for the replication session. No more than two snapshot copies of the object are retained on the primary storage unless a greater number of snapshot copies are required to satisfy an explicit snapshot retention policy specified for the primary.

Figure 18:
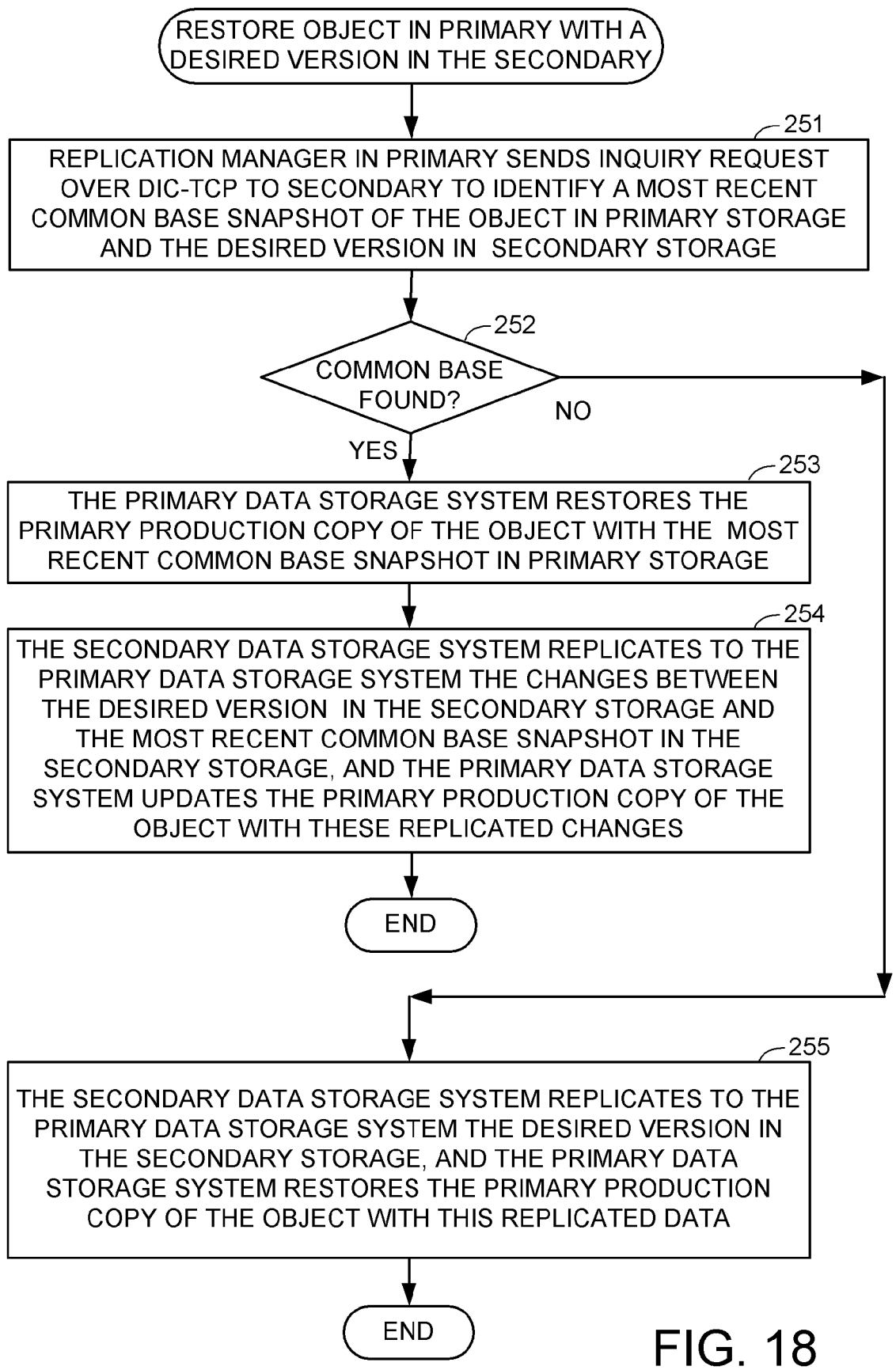
FIG. 18 is a flowchart of restoration of an object in primary storage with a remote copy from secondary storage.

FIG. 18 shows a procedure for restoring the production version of an object in primary storage with a desired version from the secondary storage. The desired version may or may not be the most recent snapshot copy of the object in the secondary storage. In a first step 251, the replication manager in the primary data storage server sends an inquiry request over the DIC-TCP connection to the secondary data storage server to identify a most recent common base snapshot of the object in primary storage and secondary storage. In step 252, if a common base is found, then execution continues to step 253. In step 253, the primary data storage server restores the primary production copy of the object with the most recent common base snapshot in the primary storage. In step 254, the secondary data storage server replicates to the primary data storage server the changes between the desired version in the secondary storage and the most recent common base snapshot in the secondary storage, and the primary data storage server updates the primary production copy of the object with these replicated changes.

In step 252, if a common base snapshot of the object is not found, then execution branches to step 255. In step 255, the secondary data storage server replicates to the primary data storage server the desired version in the secondary storage, and the primary data storage server restores the primary production copy of the object with this replicated data.

The primary data storage server can give network clients read-write access to the production copy on a priority basis during the restoration process, by servicing the network clients with data obtained from the secondary data storage server. See, for example, Armangau, "Instantaneous restoration of a production copy from a snapshot copy in a data storage system," U.S. Pat. No. 6,957,362 issued Oct. 18, 2005, incorporated herein by reference.

Figure 19:
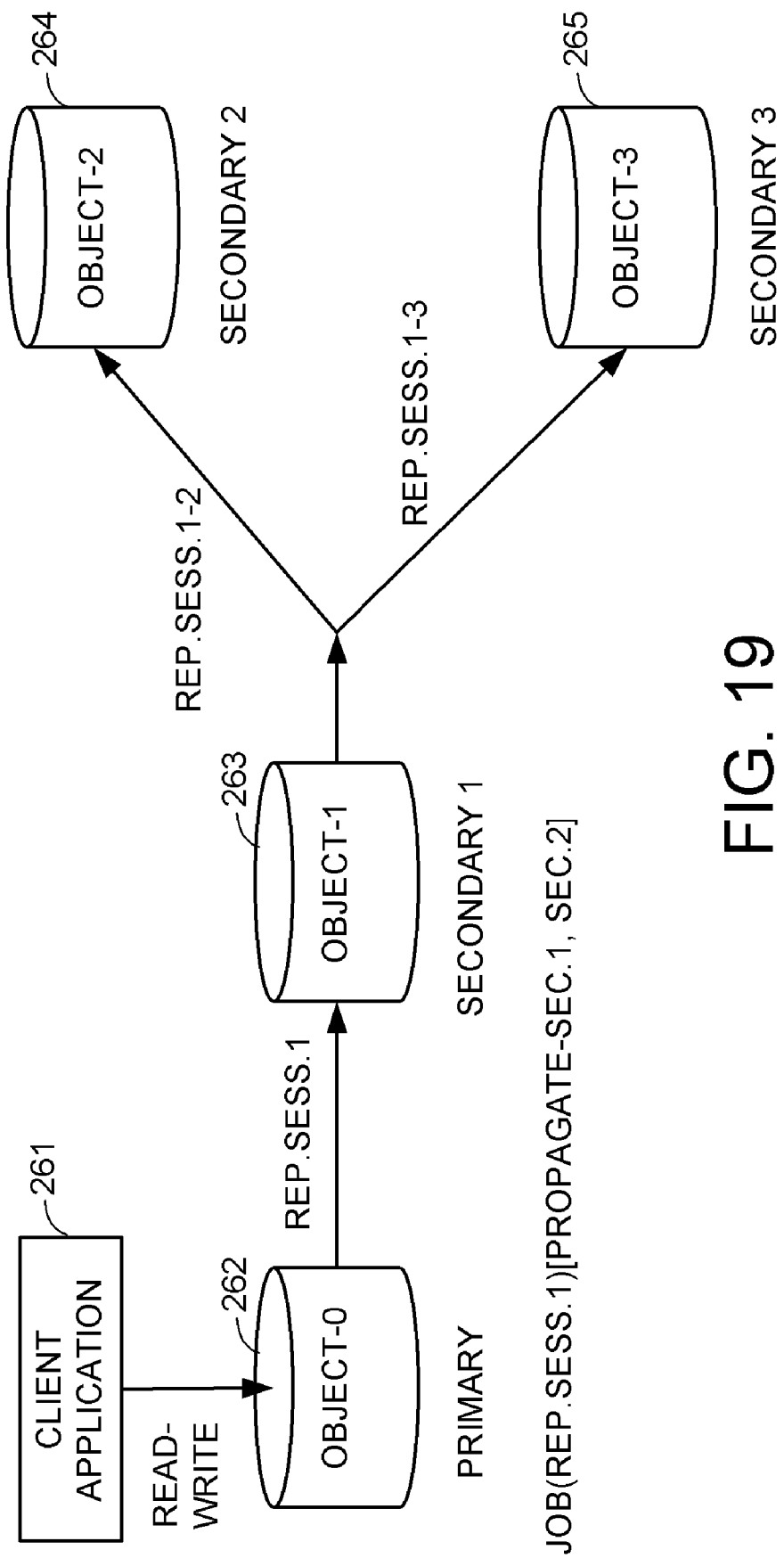
FIG. 19 is a flow diagram of cascaded replication.

FIG. 19 shows an example of propagating a replication session from one secondary data storage server to one or more additional secondary data storage servers. When a replication session is set up, an optional "propagate" attribute can be specified with a list of propagation destination IP addresses. When such a replication session is specified with a job, unless a propagate flag for the replication session is set to "FALSE", the commands and replication data of the session will be forwarded, by the secondary that is the destination of the session, to each of the propagation destination IP addresses. In addition, the secondary data storage servers at each propagation destination IP address will inherit any secondary snapshot retention policy for the replicated object that has been specified for the destination of the replication session.

In the example of FIG. 19, the replication session "REP.S-ESS.1" has been configured so that "SECONDARY 1" is the destination of the replication session, and "SECONDARY 2" and "SECONDARY 3" are propagation destinations of the session. The replication session has been started by a job including the destination session. A client application 261 performs read-write transactions upon a production version (OBJECT-0) of a data storage object in primary storage 262. The read-write transactions cause changes to the production version, and the changes are transmitted by "REP.SESS.1" to a version "OBJECT-1" in secondary storage 263. The data storage server "SECONDARY 1" runs a replication session "REP.SESS.1-2" in order to forward these changes to a version "OBJECT-2" in secondary storage 264 of "SECONDARY 2", and the data storage server "SECONDARY 1" runs a replication session "REP.SESS.1 -" in order to forward these changes to a version "OBJECT-3" in the secondary storage 265.

For example, an administrator at the control station of the primary data storage server can configure network properties of a remote secondary data storage server using the following set of commands, which set up authentication and a throttle bandwidth schedule for replication to the remote secondary:

nas_cel <remoteSystem>
-server {<mover_name>|id=<slot>|ALL}
   {-create   <remoteslot>   -interfaces   <hostname|ip
      Addr>, . . . -type <securityType> [-throttle <sched>]
   |-modify   <remoteslot>   -interfaces   <hostname|ip
      Addr>, . . . -throttle <sched>
   |-delete <remoteslot>
   |-verify <remoteslot>
   |-list}
      <sched> means {Su|M|T|W|H|F|Sa}*HH:MM-HH:
      MM/<Kb/sec> for example "MTWHF08:00-18:
      00/10000;Sa08:00-13:00/25000"

For a particular replication job, the system administrator can use the following command to change the maximum out-of-sync time (SLA, in minutes) and specify the state of a flag (True or False) to turn on and off propagation from a remote secondary to cascade destinations previously set for the remote secondary:

repJobID# SLA [propagate_flag]

Figure 20:
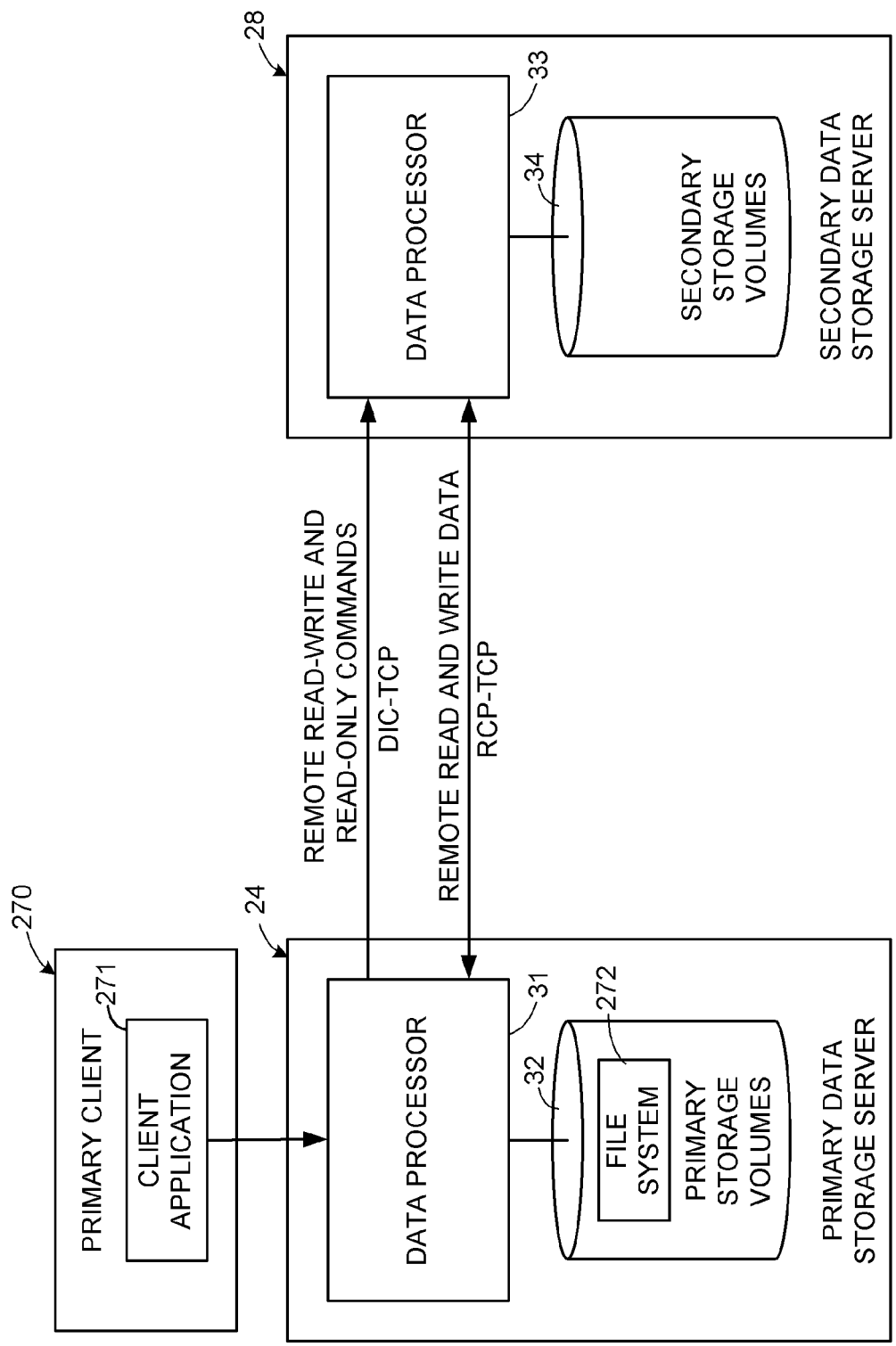
FIG. 20 is a flow diagram of remote client read-write access to the primary storage by tunneling through a control connection from the primary data storage server to the secondary data storage server.

FIG. 20 shows a primary client 270 with read-write access to the primary storage obtaining access to remote versions 34 by tunneling through the DIC-TCP control connection from the primary data storage server 24 to the secondary data storage server 28. This tunneling permits a client application to use the secondary data storage server resources without direct access to the remote site, and allows the user to see the remote versions of the storage object and manipulate them just as if they were local versions of the storage object. The primary data storage server 24 sends remote read-write and/or read-only commands over the DIC-TCP connection to the secondary data storage server 28, and remote read/write data is exchanged over the RCP-TCP connection between the secondary data storage server and the primary data storage server. In this fashion the primary data storage server functions as a proxy for the client application 271, so that the primary data storage server may authenticate and authorize the client for access to the file system 272, and supervise the client's access to the file system.

A problem with replication over IP is that packets from various sources may share a link to a common destination. There is a good likelihood that if changes from various sources are replicated to the common destination as soon as the changes are made to production versions at these sources, then network congestion may occur. Network congestion under these circumstances can be eliminated by determining a maximum bandwidth of the link or network port at the destination, and by throttling the transmission bandwidth from the various sources so that the various sources share the total maximum bandwidth at which data can be delivered to and received at the common destination.

Figure 21:
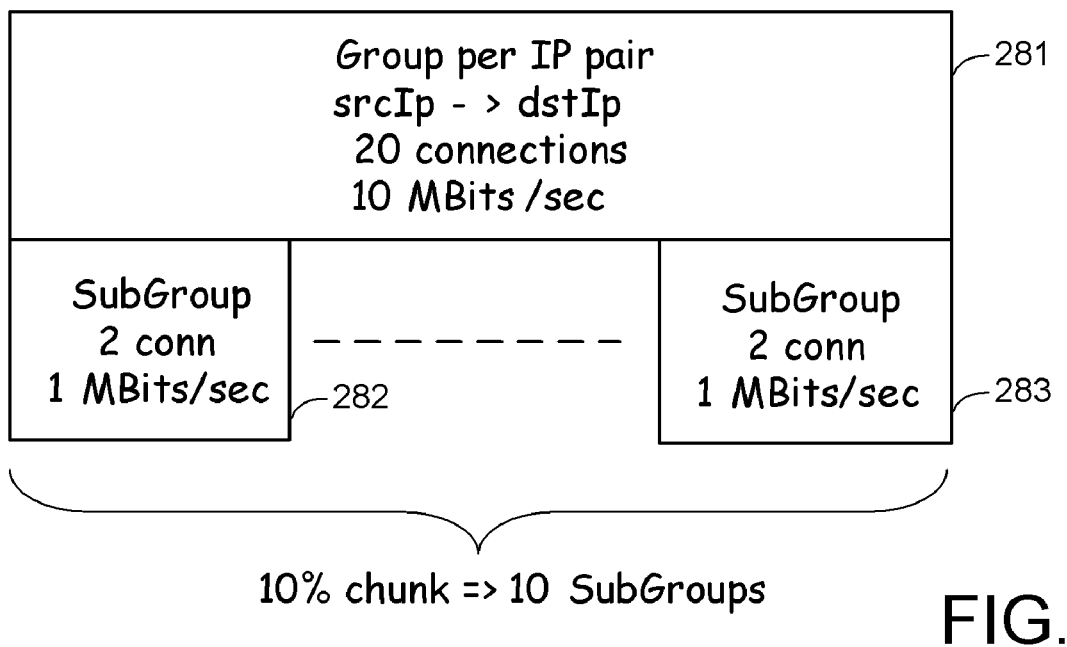
FIG. 21 is a schematic diagram showing sub-grouping of replication connections to a common Internet Protocol (IP) address for sharing of a total throughput to the common IP address.

As shown in FIG. 21, for example, a network may have twenty connections to a common destination IP address. Each connection alone may provide up to ten megabytes per second. If these twenty connections have the same destination IP address, however, the bandwidth of ten megabits per second will be shared among the twenty connections. On way of sharing this ten megabits per second among the twenty connections is to group the twenty connections into ten sub-groups of two connections each, and allocate 1 megabits per second to each sub-group. For example, in a data processing network having ten primary data storage servers and one secondary data storage server, each primary server could be allocated 1 megabits per second for its DIC-TCP connection and its RCP-TCP connection to the secondary data storage server. Such an allocation would not be efficient, however, unless the allocation could be adjusted based on the actual demands of the individual primary servers. Therefore, the common destination monitors the actual usage, and the common destination from time-to-time increases the allocation of the sources that are found to be using all or most of their allocation, and the common destination decreases the allocation of the sources that are found to be using none or little of their allocations. Thus, presently unused allocation is shifted from sources that are light users to sources that are heavy users.

Figure 22:
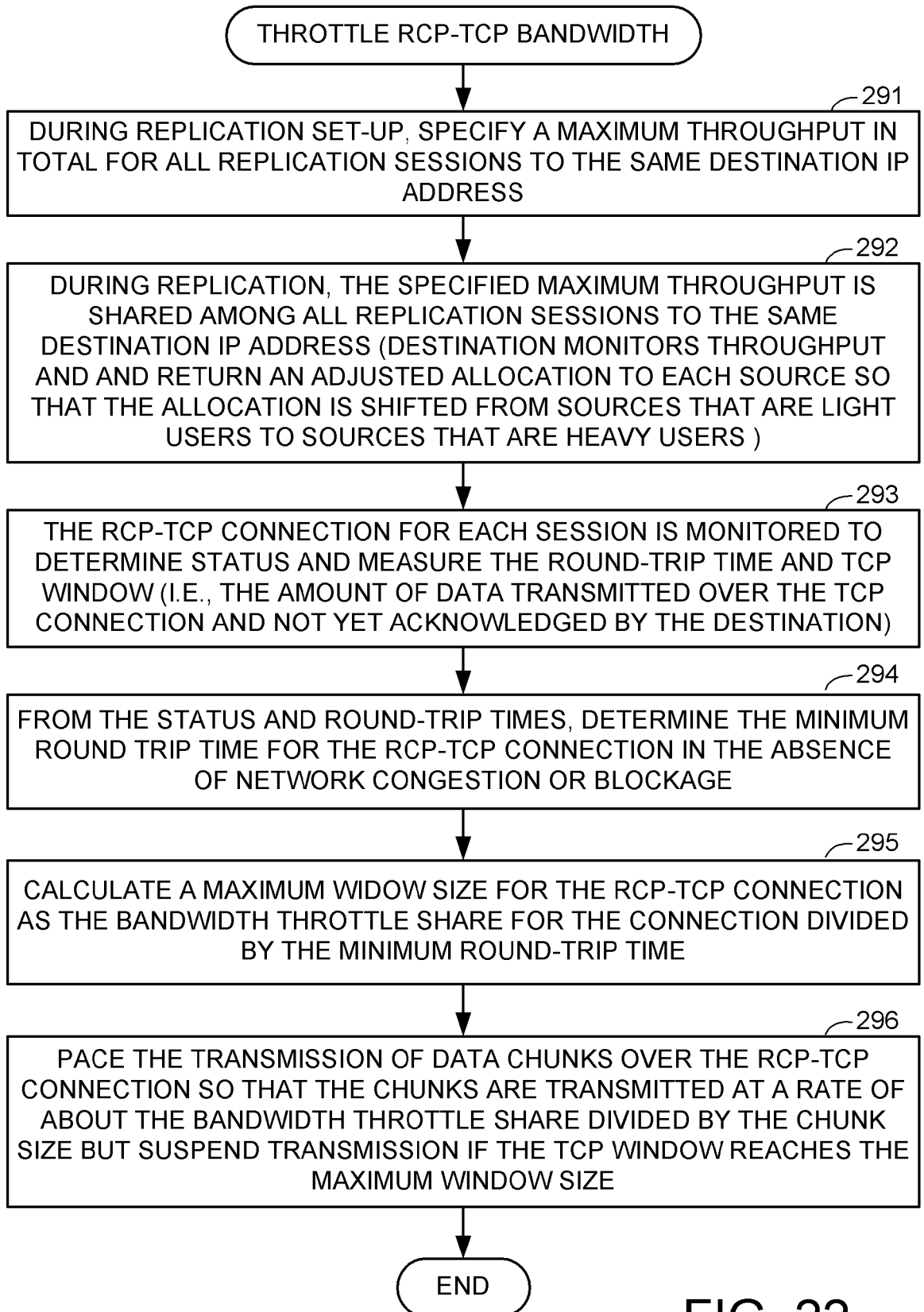
FIG. 22 is a flowchart of a procedure for throttling bandwidth of transmission of replicated data to shared destination IP address.

A specific example of throttling the RCP-TCP bandwidth is shown in FIG. 22. In a first step 291, during replication set-up, a maximum throughput is specified in total for all replication sessions to the same destination IP address. In step 292, during replication, the specified maximum throughput is shared among all replication sessions to the same destination IP addresses. Initially, each replication session is given an equal share among all replication sessions that are active, but the destination may monitor the usage of each active session and repetitively return to the source of each active session an adjusted allocation so that the unused portion of a session's fair allocation is shifted from sources that are light users to sources that are heavy users. In step 293, the primary monitors the RCP-TCP connection for each session to determine the status of the session and measure the round trip time and TCP window for the RCP-TCP connection. The TCP window for the connection is the amount of data transmitted by the primary or source over the TCP connection and not yet acknowledged by the destination. In step 294, from the status and round-trip time, the primary determines the minimum round trip time for the RCP-TCP connection, which is the round-trip time in the absence of network congestion or blockage. In step 295, the primary calculates a maximum window size for the RCP-TCP connection as the bandwidth throttle share for the connection (as adjusted from time-to-time by the secondary data storage server at the destination) divided by the minimum round-trip time. Finally, in step 296, the primary paces the transmission of data chunks over the RCP-TCP connection so that the chunks are transmitted at a rate of about the bandwidth throttle share divided by the chunk size, but the transmission is suspended if the TCP window reaches the TCP window size. If the transmission is suspended, the transmission will resume once the receipt of the data in transit is acknowledged by the destination.

Figure 23:
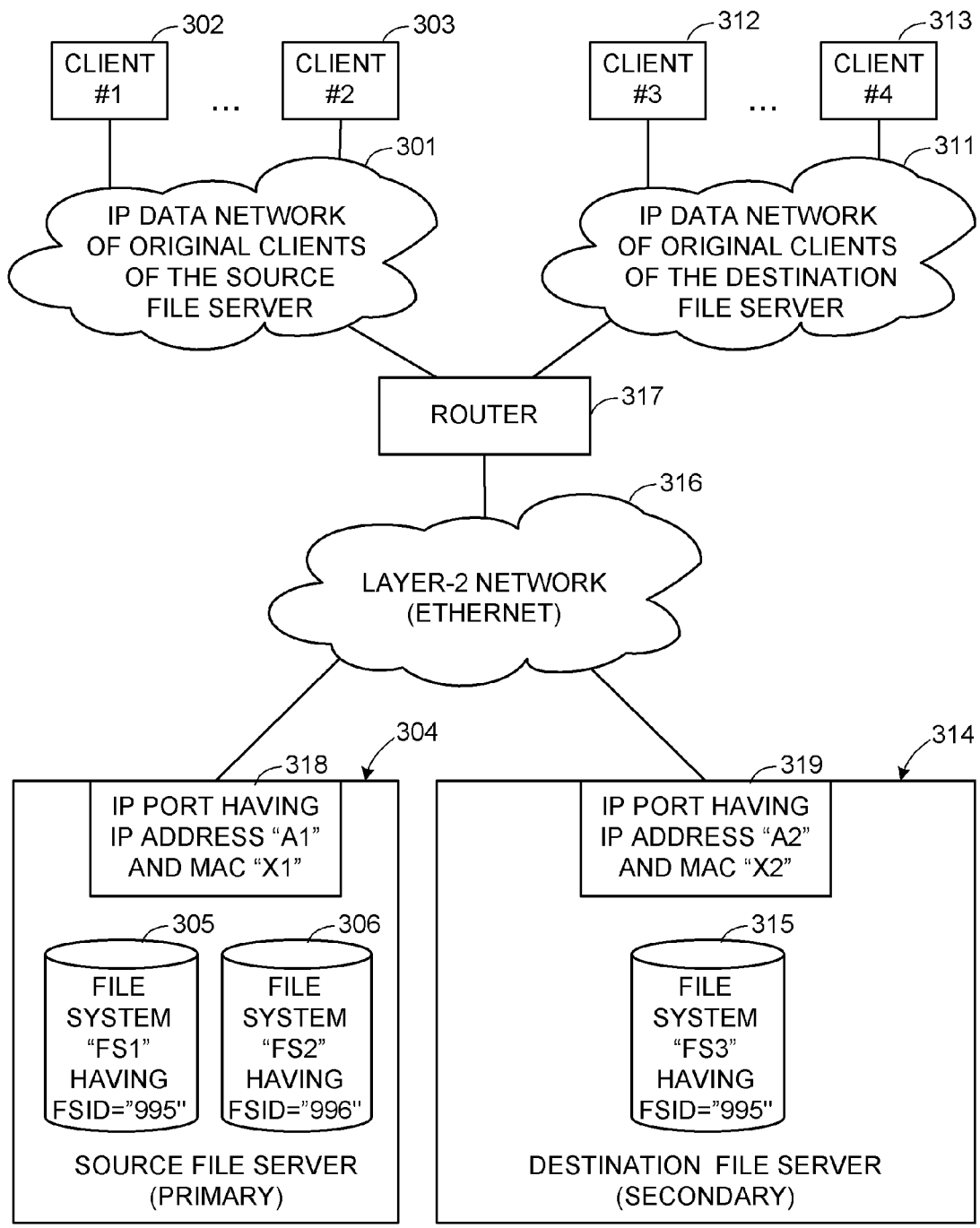
FIG. 23 shows a data network in which a source file server has been interconnected to a destination file server for file system migration during which the destination file server may assume the original IP address of the source file server for a non-disruptive switch-over of client file access from the source file server to the destination file server using persistent file handles.

FIG. 23 shows a data network in which a source file server 304 has been interconnected to a destination file server 314 for the purposes of file system migration disaster recovery during which the destination file server may assume the original IP address of the source file server for a non-disruptive switch-over of client file access from the source file server to the destination file server using persistent file handles. Originally an IP data network 301 interconnects clients 302, 303 to the source file server 304 for access to a file system 305 named "FS1" and a file system named 306 named "FS2." In a similar fashion, originally an IP data network 311 interconnects clients 312, 313 to the destination file server 314 for access to a file system 315 named "FS3." It is then desired to migrate or move in response to changed business or environmental reasons the file systems "FS1" and "FS2" from the source file server 304 to the destination file server 314 in such a way that there can be a non-disruptive switch-over of client file access from the source file server to the destination file server without inconveniencing the end users with stale file handles.

In the data network of FIG. 23, the servicing of client file access can be switched over from the source file server 304 to the destination file server 314 at the request of the system administrator at any time during a replication process. For example, client file access can be switched over in order to provide the clients with access to a destination file server having increased storage, enhanced performance, or additional service capabilities. The servicing of client file access can also be switched over automatically from the source file server 304 to the destination file server 314 upon detection of a failure of the source file server 304 to service file access requests from the clients 302 and 303 when there has been an ongoing replication of the client's file systems 305, 306 from the source file server 304 to the destination file server 314. In either case the replication and switch-over results in the migration of the most up-to-date copy of the client's file system from the source file server to the destination file server.

A problem with switching-over client file access during replication is that persistent file handles that have been issued by the source file server normally do not identify the versions of the replicated files that reside on the destination file server. Therefore, when the destination file server 314 begins servicing the original clients 302, 303 of the source file server 304, any persistent file handles issued by the source file server 304 to the original clients 302, 303 normally are not usable for proper access to the replicated files in the destination file server 314.

A file handle is used in the NAS NFS protocol for uniquely identifying a file. In order for a client to access a specified file in a file server, the client first sends a lookup request to the file server. The lookup request includes a path name specifying the file. In response to the lookup request, the server returns a file handle to the client. The client then uses the file handle in subsequent requests to access the file. A file handle typically includes a file system identifier (FSID) and a file identifier (fid). The FSID uniquely identifies the file system within the file server for client access at a particular IP address of the file server. The file identifier (fid) typically is the inode number of the inode of the file.

Typically the FSID is automatically generated by a file server when a file system is created. The client specifies a name for a new file system, and the file server allocates storage for the file system and assigns a unique FSID to the file system. The FSID is part of the metadata of the file system. The automatic assignment of the FSID ensures that any two file systems accessible via the same IP address of the file server do not use the same FSID. If two file systems accessible via the same IP address would use the same FSID, then the file handles would be ambiguous. This would be a very undesirable situation, because an ambiguous file handle may cause a client to read from, write to, or delete the wrong file.

For some purposes, it is desirable to permit a system administrator to change the FSID of a file system. For example, a file server may contain a mirror or backup copy of an original file system, and if the original file system becomes inaccessible or corrupted, the system administrator may remove or unmount the original file system, and then change the FSID of the mirror or backup copy to the FSID of the original file system. In this fashion, the mirror or backup copy assumes the identity of the original file system.

For switch-over of access to replicated file systems to be accessed with NFS, it is desirable for the destination file server to use the same file system metadata to generate file handles as the source file server. This permits clients to use persistent file handles for file access concurrent with the switch-over. Therefore the switch-over can be entirely transparent to the clients, without the destination file server generating any "stale handle" error when the destination server receives a file access request including a file handle returned from the source file server. The NFS mounts and the cached file handles in the clients will not go stale so that the clients will not need to reboot or issue new lookup requests to access files in the destination server.

A transparent switch-over of client access may result when the destination file server assumes the IP address of the source file server upon switch-over in order to intercept file access requests from the original clients of the source file server, and when the destination file server uses the same file handle format, FSID, and fids for the destination file system as used by the source file server for the source file system. For example, a transparent switch-over of client access results when the following three conditions are satisfied: (1) after the switch-over, the destination file server appears to have the same IP address as the primary file server prior to the switch-over; (2) after the switch-over, the destination file server is either using the same media access control (MAC) address as the source file server prior to the switch-over OR the clients are all at least one router hop away from the source destination file server and the destination file server (so that the clients see the MAC of the router not of the file servers); and (3) the file handle generation logic for the destination file server is the same as for the source file server.

Figure 24:
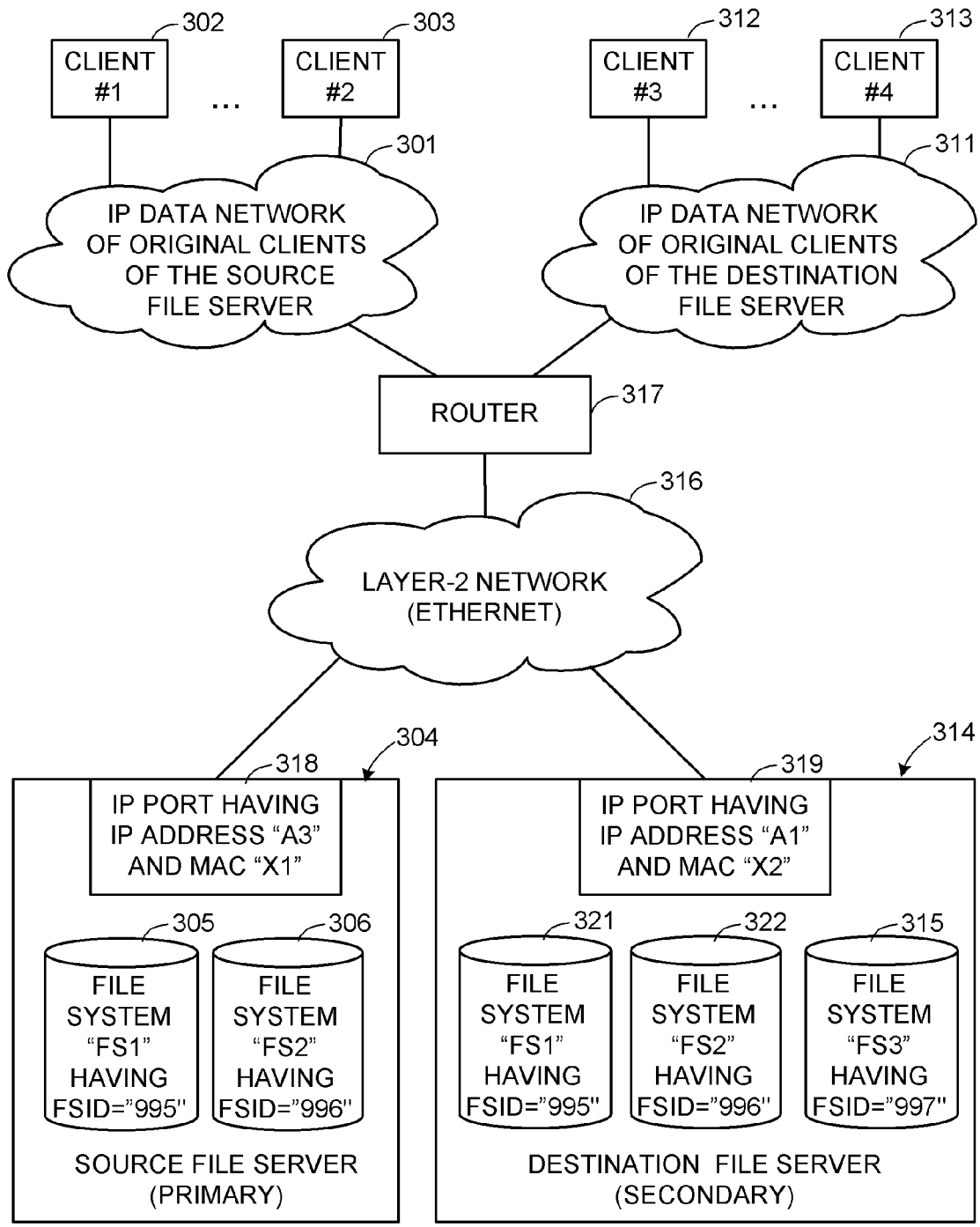
FIG. 24 shows the data network of FIG. 23 after the allocation of destination file systems in the destination file server and the destination file server assuming the original IP address of the source file server.

The first two conditions can be satisfied in various ways, such as by using the network configuration of FIG. 23. In this example, a layer-2 network 316 (e.g. an Ethernet) connects the source file server to the destination file server by linking an IP port 318 of the source file server 304 to an IP port 319 of the destination file server 314. A router 317 connects the network 301 of original source server clients and a network 311 of original destination server clients to the layer-2 network to ensure that all of the original source clients are at least one router hop away from the source and destination file servers. Prior to switch-over, the IP port 318 of the source file server 304 is programmed to have an IP address of "A1" and a MAC of "X1", and the IP port 319 of the destination file server 314 is programmed to have an IP address of "A2" and a MAC address of "X2". Then, upon switch-over during the migration process, the destination file server 314 is re-assigned the IP address "A1" that was originally used by the source file server 304, and the original clients 302, 303 of the source file server are allowed to connect to the destination file server. To avoid conflict between the IP address of the source file server 304 and the IP address of the destination file server 314 upon switch-over, the source file server 304 can be removed from the layer-2 network 316, or the IP address of the source file server 304 is also changed during the switch-over. For example, FIG. 24 shows that after switch-over, the IP address of the source file server has been changed to "A3".

If the file handle generation logic in the destination server is identical to the file handle generation logic in the source server, the clients will pick up where they left off (with all of their cached file handles still valid). If the file handle generation is different (e.g., if the FSIDs of the migrated files on the destination server are different from the FSIDs of the original files on the source server) then the clients' mounts will go stale and the clients will have to umount/remount or reboot, depending on the particular circumstances.

To provide file handle generation logic in the destination file server that is identical to the file handle generation logic in the source file server without changing the conventional format of the file handle, the respective FSIDs of the migrated files in the destination server should be set identical to the FSIDs of the original files in the source server. This is not disruptive so long as the destination server is not already using the FSIDs of the original files to be migrated. Therefore, when a replication session is created and the destination is specified as a volume pool (not an explicit file system), the destination server attempts to assign the same FSID to the new file system being created on the destination server as the FSID on the source file server so long as this FSID is not already being used on the destination server. If this FSID is already being used on the destination server, then either a different FSID is chosen and any file handles issued for the original FSID by the source file server are invalidated (e.g., by unmounting the file system on the clients of the source file server so that the original FSID from the source file server is purged from the file handle caches of these clients) or the FSID of the file system already using it on the destination server is changed and any file handles issued for the original FSID by the destination file server are invalidated (e.g., by unmounting the file system on the clients of the destination file server so that the original FSID from the destination file server is purged from the file handle caches of these clients).

FIG. 23 shows a specific example in which the file system 305 named "FS1" in the source file server 304 has a FSID of "995", the file system 306 named "FS2" in the source file server 304 has a FSID of "996", and the file system 315 named "FS3" has a FSID of "995". Replication of the file system 305 named "FS1" from the source file server 304 to the destination file server 314 involves an FSID conflict because the destination file server already contains a different file system 315 named "FS3" having the same FSID of "995". FIG. 24 shows that this conflict has been resolved by resetting the FSID of the file system 315 to "997" so that a new destination file system 321 named "FS1" is created having a FSID of "995" in the destination file server. Replication of the file system 306 named "FS2" from the source file server 304 to the destination file server 314 does not involve a FSID conflict and therefore a new destination file system 322 named "FS2" is created having the same FSID of "996" in the destination file server.

FIG. 25 shows how a non-disruptive migration with persistent file handles is performed for the file systems and clients of a source file server such as the source file server 304 in FIG. 23. In a first step 331 of FIG. 25, the destination file server is interconnected to the IP network between the source file server and the original clients of the source file server so that the destination file server may assume the IP address of the source file server in order to intercept file access requests from the original clients of the source file server. The file access requests received by the destination file server may include file handles issued by the source file server.

In step 332, a replication session is created for each source file system, and the free volume pool of the destination file server is specified as the destination file system for the replication session. At the start of the replication session, the source file server sends to the destination file server the source file system metadata including the FSID of the source file system, and the destination file server allocates a storage volume from its free volume pool to contain the secondary copy of the source file system.

In step 333, the destination file server checks whether or not the FSID of each source file system is already in use on the destination file server. If the FSID of the source file server is not already in use on the destination file server, then the destination file server assigns the same FSID to the storage volume to contain the secondary copy of the source file system. If the FSID of the source file server is already in use on the destination file server, then the destination file server can automatically resolve the conflict by unmounting the conflicting volume already in use on the destination server, assigning a new FSID to the conflicting volume already in use on the destination server, and remounting the conflicting volume already in use on the destination server. This process causes the clients having access to the conflicting volume already in use on the destination server to purge their caches of any stale file handles of the file system of the conflicting volume already in use on the destination server. Once any stale file handles are no longer usable by clients of the destination file server, the old FSID is assigned to the storage volume that was allocated to contain the secondary copy of the source file system. Therefore, by the end of step 333, the destination file server has assigned the FSID of the source file system to the storage volume that the destination file server allocates to contain the secondary copy of the source file system.

Once any FSID conflict is resolved and a storage volume of the destination file server is allocated to contain the secondary copy of the source file system, the replication session begins replicating data of the source file system to the allocated destination volume.

In step 334, when it is desired to switch file access of the original clients of the source file server over to the destination file server, the destination file server assumes the IP address of the source file server. So long as the source file server is operational, the replication of data of the source file system to the allocated destination volume may continue so that the destination file system is brought up to date with the source file system. Preferably the replication occurs in background, concurrent with the destination file server giving priority to servicing of file access requests from original clients of the source file server. For example, if the destination file server receives a client request to access data that has not yet been replicated from the source file system to the volume allocated to contain the secondary copy of the source file system, then the destination file server responds by fetching the data from the source file system on the source file server, storing the data in the volume allocated to contain the secondary copy of the source file system, and then accessing the data in the secondary copy of the source file system. Further details of such a process of replication in background concurrent with a destination file server giving priority to servicing file access requests from network clients can be found in Bober et al. U.S. Pat. No. 6,938,039 issued Aug. 30, 2005, incorporated herein by reference.

In view of the above, a data storage server is programmed for management, version control, and scheduling of replication of data storage objects of multiple data storage object types. The multiple data storage object types include iSCSI LUNs, file systems, virtual servers, directories, and files. The version control determines if two data storage objects are the same or have a common base so that only a difference needs to be transmitted for replication or restoration. The scheduler controls the timing of snapshot creation and deletion, and replication transmission to one or more remote destinations. A replication job may specify coincident replication sessions, and if the coincident replication sessions specify the same data storage object and different destinations, then the replication data is read once from the data storage object and transmitted to the different destinations in a "one to many" replication. A cascaded replication can be set up by configuring a replication session with a list of propagation destinations, so that the replication data is received at a destination of the session and automatically forwarded from the destination of the session to each of the propagation destinations. Concurrent replication sessions having the same destination share reception bandwidth of the destination. For fair and efficient usage of the total reception bandwidth, a respective bandwidth allocation share is adjusted for each session, and the data transmission of each session to the common destination is paced in accordance with the respective bandwidth allocation share. The remote replication of a file from a primary data storage server to a secondary data storage server includes remote replication of corresponding file handle information so that a file handle issued by a primary data storage server to a network client can be used by the network client for accessing the replicated file in the secondary data storage server.

What is claimed is:

1. A method of restoring, in a first data storage server, a data storage object from a desired version of the data storage object, the desired version of the data storage object residing in data storage of a second data storage server, said method comprising:

the first data storage server communicating with the second data storage server to identify a most recent common base snapshot copy of the data storage object, a first copy of the most recent common base snapshot copy residing in data storage of the first data storage server and a second copy of the most recent common base snapshot copy residing in the data storage of the second data storage server; and the second data storage server transmitting to the first data storage server changes between the desired version of the data storage object and the second copy of the most recent common base snapshot copy; and the first data storage server receiving the changes from the second data storage server and using the changes for restoring, from the first copy of the most recent common base snapshot copy, a local production version of the data storage object;

wherein said method is used for restoring, in the first data storage server an iSCSI LUN data storage object from a desired version of the iSCSI LUN data storage object, the desired version of the iSCSI LUN data storage object residing in the data storage of the second data storage server, wherein said method is used for restoring in the first data storage server, a file system data storage object from a desired version of the file system data storage object, the desired version of the file system data storage object residing in the data storage of the second data storage server, and which further includes the first data storage server initially receiving the first copy of the most recent common base snapshot copy remote replication from a third data storage server, and the second data storage server initially receiving the second copy of the most recent common base snapshot copy by remote replication from the third data storage server, and which includes specifying a retention policy for snapshot copies in the third data storage server, and wherein the remote replication from the third data storage server includes the third data storage server replicating the retention policy for snapshot copies to the first data storage server and to the second data storage server.

2. A method of restoring, in a first data storage server, a data storage object from a desired version of the data storage object, the desired version of the data storage object residing in data storage of a second data storage server, said method comprising:

the first data storage server communicating with the second data storage server to identify a most recent common base snapshot copy of the data storage object, a first copy of the most recent common base snapshot copy residing in data storage of the first data storage server and a second copy of the most recent common base snapshot copy residing in the data storage of the second data storage server; and the second data storage server transmitting to the first data storage server changes between the desired version of the data storage object and the second copy of the most recent common base snapshot copy; and the first data storage server receiving the changes from the second data storage server and using the changes for restoring, from the first copy of the most recent common base snapshot copy, a local production version of the data storage object wherein said method is used for restoring in the first data storage server an iSCSI LUN data storage object from a desired version of the iSCSI LUN data storage object, the desired version of the iSCSI LUN data storage object residing in the data storage of the second data storage server, wherein said method is used for restoring in the first data storage server, a file system data storage object from a desired version of the file system data storage object, the desired version of the file system data storage object residing in the data storage of the second data storage server, and which further includes the first data storage server initially receiving the first copy of the most recent common base snapshot copy remote replication from a third data storage server and the second data storage server initially receiving the second copy of the most recent common base snapshot copy by remote replication from the third data storage server, and wherein the remote replication from the third data storage server to the first data storage server includes replicating file handle information from the third data storage server to the first data storage server, and wherein said method further includes the third data storage server issuing a file handle to a network client accessing the file system data storage object, and the network client using the file handle in a read-write request sent to the first data storage server, and the first data storage server receiving the file handle and using the file handle information replicated from the third data storage system for accessing a production version of the file system data storage object in said first data storage server.

* * * * *